(12) United States Patent
Matsumoto et al.

(10) Patent No.: US 7,990,105 B2
(45) Date of Patent: Aug. 2, 2011

(54) POWER SUPPLY DEVICE FOR A VEHICLE

(75) Inventors: Takaie Matsumoto, Shizuoka-ken (JP);
Yukiharu Hosoi, Shizuoka-ken (JP);
Shigeto Suzuki, Shizuoka-ken (JP);
Takeshi Ikeda, Shizuoka-ken (JP);
Toshinori Fukudome, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 346 days.

(21) Appl. No.: 11/687,488

(22) Filed: Mar. 16, 2007

(65) Prior Publication Data
US 2007/0216226 A1    Sep. 20, 2007

(30) Foreign Application Priority Data

Mar. 17, 2006   (JP) ................................. 2006-075500

(51) Int. Cl.
*H02J 7/00*    (2006.01)
*H01M 2/10*    (2006.01)

(52) U.S. Cl. ........ 320/120; 320/104; 320/107; 320/116; 320/123; 429/96; 429/97; 429/99

(58) Field of Classification Search ................. 320/104, 320/116, 120, 126; 439/504, 521, 522, 626, 439/627
See application file for complete search history.

(56) References Cited

U.S. PATENT DOCUMENTS

| | | | |
|---|---|---|---|
| 3,566,165 A | 2/1971 | Lohr | |
| 3,921,745 A | 11/1975 | McCulloch et al. | |
| 4,132,281 A | 1/1979 | Gaddi | |
| 4,444,853 A * | 4/1984 | Halsall et al. | 429/54 |
| 4,467,407 A | 8/1984 | Asano et al. | |
| 4,536,668 A | 8/1985 | Boyer | |
| 4,763,538 A | 8/1988 | Fujita et al. | |
| 4,829,208 A | 5/1989 | Uchino | |
| 5,014,800 A | 5/1991 | Kawamoto et al. | |
| 5,024,113 A | 6/1991 | Ito et al. | |

(Continued)

FOREIGN PATENT DOCUMENTS

EP    0 555 773 A1    8/1993

(Continued)

OTHER PUBLICATIONS

European Search Report issued in European Application No. 07 00 5511 on May 16, 2007.

(Continued)

*Primary Examiner* — Edward Tso
*Assistant Examiner* — Johali A Torres Ruiz
(74) *Attorney, Agent, or Firm* — Keating & Bennett, LLP

(57) ABSTRACT

A high voltage power supply device has a plurality of battery modules connected to each other in series by coupling a safety plug unit to a safety plug unit connecting base to output a series voltage from a power supply output coupler. The safety plug unit connects/disconnects electrode terminals of all the battery modules to each other. Female electrode bodies electrically connected to power supply terminals of the respective battery modules are collectively positioned in a limited area and are arranged at equal intervals on the safety plug unit connecting base. An output voltage of each battery module is set to be lower than 50V to reduce the risk of injury during use, inspection or maintenance of the high voltage power supply device and to downsize the device.

13 Claims, 19 Drawing Sheets

U.S. PATENT DOCUMENTS

| | | | |
|---|---|---|---|
| 5,036,213 | A | 7/1991 | Isozumi |
| 5,087,229 | A | 2/1992 | Hewko et al. |
| 5,144,183 | A | 9/1992 | Farrenkopf |
| 5,272,938 | A | 12/1993 | Hsu et al. |
| 5,294,853 | A | 3/1994 | Schluter et al. |
| 5,304,878 | A | 4/1994 | Oda et al. |
| 5,442,250 | A | 8/1995 | Stridsberg |
| 5,505,277 | A | 4/1996 | Suganuma et al. |
| 5,570,752 | A | 11/1996 | Takata |
| 5,581,136 | A | 12/1996 | Li |
| 5,588,498 | A | 12/1996 | Kitada |
| 5,595,257 | A | 1/1997 | Yoshida et al. |
| 5,691,584 | A | 11/1997 | Toida et al. |
| 5,755,304 | A | 5/1998 | Trigg et al. |
| 5,798,702 | A | 8/1998 | Okamoto et al. |
| 5,818,134 | A | 10/1998 | Yang et al. |
| 5,826,675 | A | 10/1998 | Yamamoto |
| 5,899,828 | A | 5/1999 | Yamazaki et al. |
| 5,915,493 | A | 6/1999 | Nakayama |
| 5,960,901 | A | 10/1999 | Hanagan |
| 6,011,366 | A | 1/2000 | Murakami et al. |
| 6,046,518 | A | 4/2000 | Williams |
| 6,048,289 | A | 4/2000 | Hattori et al. |
| 6,116,363 | A | 9/2000 | Frank |
| 6,121,711 | A | 9/2000 | Nakahara et al. |
| 6,155,366 | A | 12/2000 | Lin |
| 6,158,543 | A * | 12/2000 | Matsuto et al. ............... 180/220 |
| 6,190,282 | B1 | 2/2001 | Deguchi et al. |
| 6,190,283 | B1 | 2/2001 | Uchida |
| 6,199,652 | B1 | 3/2001 | Mastroianni et al. |
| 6,252,377 | B1 | 6/2001 | Shibutani et al. |
| 6,276,481 | B1 | 8/2001 | Matsuto et al. |
| 6,315,068 | B1 | 11/2001 | Hoshiya |
| 6,321,863 | B1 | 11/2001 | Vanjani |
| 6,522,959 | B1 | 2/2003 | Sawamura et al. |
| 6,590,306 | B2 | 7/2003 | Terada |
| 6,736,227 | B2 | 5/2004 | Huang et al. |
| 6,752,226 | B2 | 6/2004 | Naito et al. |
| 6,765,327 | B2 | 7/2004 | Hashimoto et al. |
| 6,799,650 | B2 | 10/2004 | Komiyama et al. |
| 6,823,954 | B2 | 11/2004 | Shimabukuro et al. |
| 6,994,652 | B2 | 2/2006 | Atarashi et al. |
| 7,006,906 | B2 | 2/2006 | Kobayashi et al. |
| 7,017,694 | B2 | 3/2006 | Shirazawa |
| 7,023,102 | B2 | 4/2006 | Itoh |
| 7,047,116 | B2 | 5/2006 | Ishikawa et al. |
| 7,071,642 | B2 | 7/2006 | Wilton et al. |
| 7,077,223 | B2 | 7/2006 | Kubodera et al. |
| 7,104,347 | B2 | 9/2006 | Severinsky et al. |
| 7,223,200 | B2 | 5/2007 | Kojima et al. |
| 7,228,209 | B2 | 6/2007 | Izawa et al. |
| 7,328,091 | B2 | 2/2008 | Kimura |
| 7,342,342 | B2 | 3/2008 | Naitou et al. |
| 2001/0010439 | A1 | 8/2001 | Klingler et al. |
| 2003/0019455 | A1 | 1/2003 | Onozawa et al. |
| 2003/0026118 | A1 | 2/2003 | Ikimi et al. |
| 2003/0221887 | A1 | 12/2003 | Hsu |
| 2004/0055799 | A1 | 3/2004 | Atarashi et al. |
| 2004/0060753 | A1 | 4/2004 | Ito et al. |
| 2004/0158365 | A1 | 8/2004 | Tabata et al. |
| 2004/0173393 | A1 | 9/2004 | Man et al. |
| 2004/0213371 | A1 | 10/2004 | Bruder et al. |
| 2004/0257033 | A1 * | 12/2004 | Kubota et al. ............... 320/107 |
| 2005/0111246 | A1 | 5/2005 | Lai et al. |
| 2006/0030454 | A1 | 2/2006 | Uchisasai et al. |
| 2006/0032690 | A1 | 2/2006 | Inomoto et al. |
| 2006/0090945 | A1 | 5/2006 | Ishida et al. |
| 2006/0194101 | A1 * | 8/2006 | Ha et al. ............... 429/158 |
| 2006/0207812 | A1 | 9/2006 | Saitou |
| 2006/0219447 | A1 | 10/2006 | Saitou et al. |
| 2006/0260851 | A1 | 11/2006 | Taue et al. |
| 2006/0289208 | A1 | 12/2006 | Katsuhiro et al. |
| 2006/0289214 | A1 | 12/2006 | Katsuhiro et al. |
| 2007/0017723 | A1 | 1/2007 | Terada et al. |
| 2007/0029121 | A1 | 2/2007 | Saitou et al. |

FOREIGN PATENT DOCUMENTS

| | | |
|---|---|---|
| EP | 0 604 981 A2 | 7/1994 |
| EP | 0 819 561 A2 | 1/1998 |
| EP | 0 980 821 A2 | 2/2000 |
| EP | 1 065 362 A1 | 1/2001 |
| EP | 1 151 892 A | 11/2001 |
| EP | 1 270 302 | 1/2003 |
| EP | 1 447 282 A2 | 8/2004 |
| EP | 1 447 530 | 8/2004 |
| EP | 1 518 737 | 3/2005 |
| EP | 1 526 020 | 4/2005 |
| EP | 1 574 379 | 9/2005 |
| EP | 1 705 049 A2 | 9/2006 |
| JP | 2-7702 | 1/1990 |
| JP | 2-37027 | 2/1990 |
| JP | 03-215154 | 9/1991 |
| JP | 4-185207 | 7/1992 |
| JP | 5-300712 | 11/1993 |
| JP | 8-175474 | 7/1996 |
| JP | 8-175477 | 7/1996 |
| JP | 8-256403 | 10/1996 |
| JP | 9-191501 | 7/1997 |
| JP | 10-080001 | 3/1998 |
| JP | 11-122886 | 4/1999 |
| JP | 11-034965 | 9/1999 |
| JP | 2000-337192 | 5/2000 |
| JP | 2000-261911 | 9/2000 |
| JP | 2000-261988 | 9/2000 |
| JP | 2000-343964 | 12/2000 |
| JP | 2001-105899 | 4/2001 |
| JP | 2001-298901 | 10/2001 |
| JP | 2001-341685 | 12/2001 |
| JP | 2002-021601 | 1/2002 |
| JP | 2002-262404 | 9/2002 |
| JP | 2002-325412 | 11/2002 |
| JP | 2003-191761 | 7/2003 |
| JP | 2003-191883 | 7/2003 |
| JP | 2004-007919 | 1/2004 |
| JP | 2004-060498 | 2/2004 |
| JP | 2004-166369 | 10/2004 |
| JP | 2005-98251 | 4/2005 |
| WO | WO 00/43259 A1 | 7/2000 |
| WO | WO 2004/054836 | 7/2004 |

OTHER PUBLICATIONS

U.S. Appl. No. 11/687,452, filed Mar. 16, 2007, Matsumoto, et al.
European Search Report for EP 1 270 395, dated Mar. 23, 2005.
European Search Report for EP 06 01 2978, dated Dec. 20, 2006.
European Search Report for EP 06 01 2979, dated Oct. 3, 2006.
European Search Report for EP 07 00 3224, dated Apr. 24, 2007.
Non-final Office Action mailed Oct. 15, 2007 received in U.S. Appl. No. 11/389,514.
Non-final Office Action mailed Nov. 20, 2007 received in U.S. Appl. No. 11/426,244.
Non-final Office Action mailed May 22, 2008 received in U.S. Appl. No. 11/426,244.
Non-final Office Action mailed Jun. 9, 2008 received in U.S. Appl. No. 11/429,116.

* cited by examiner

[FIG. 1]
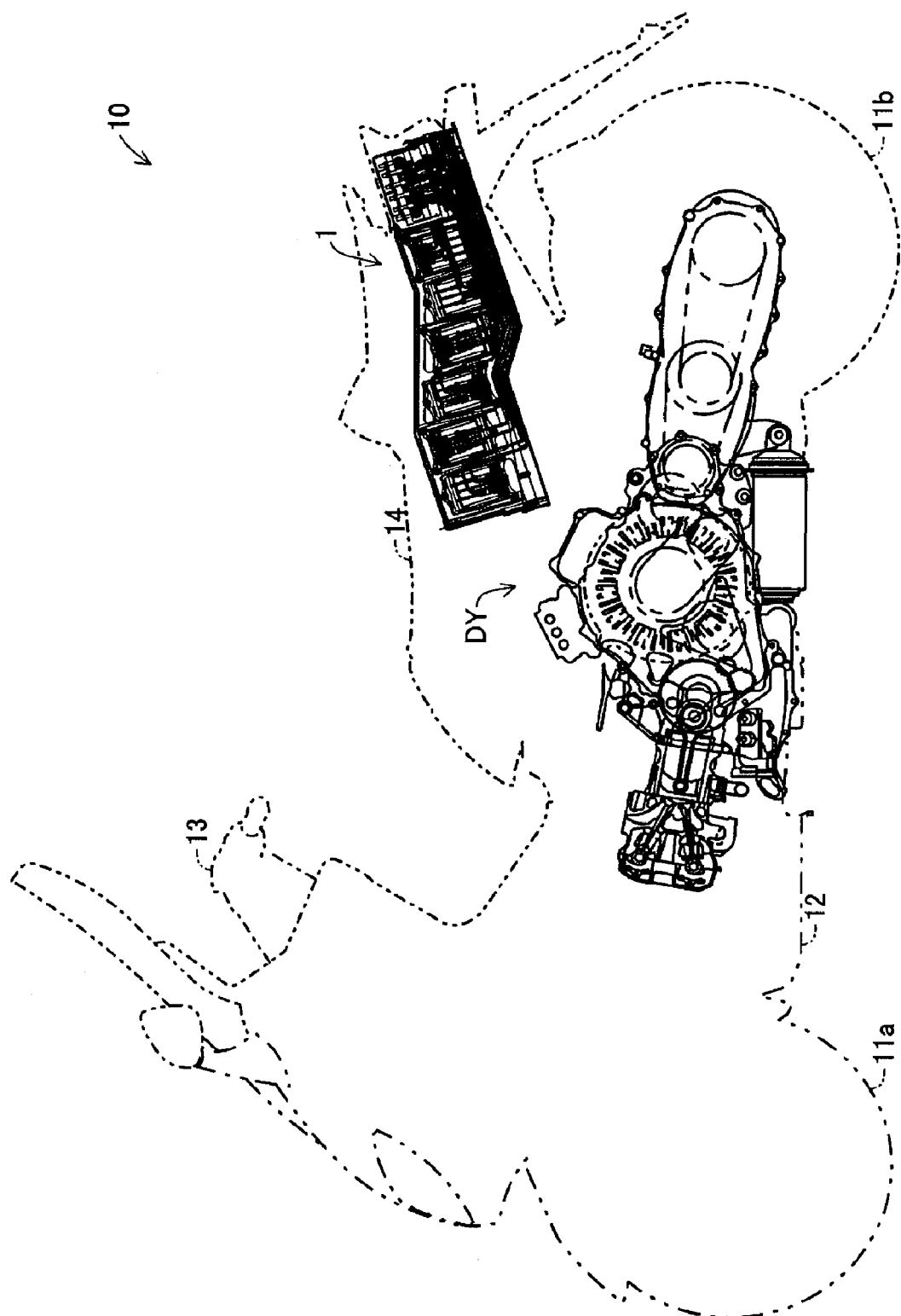

[FIG. 2]
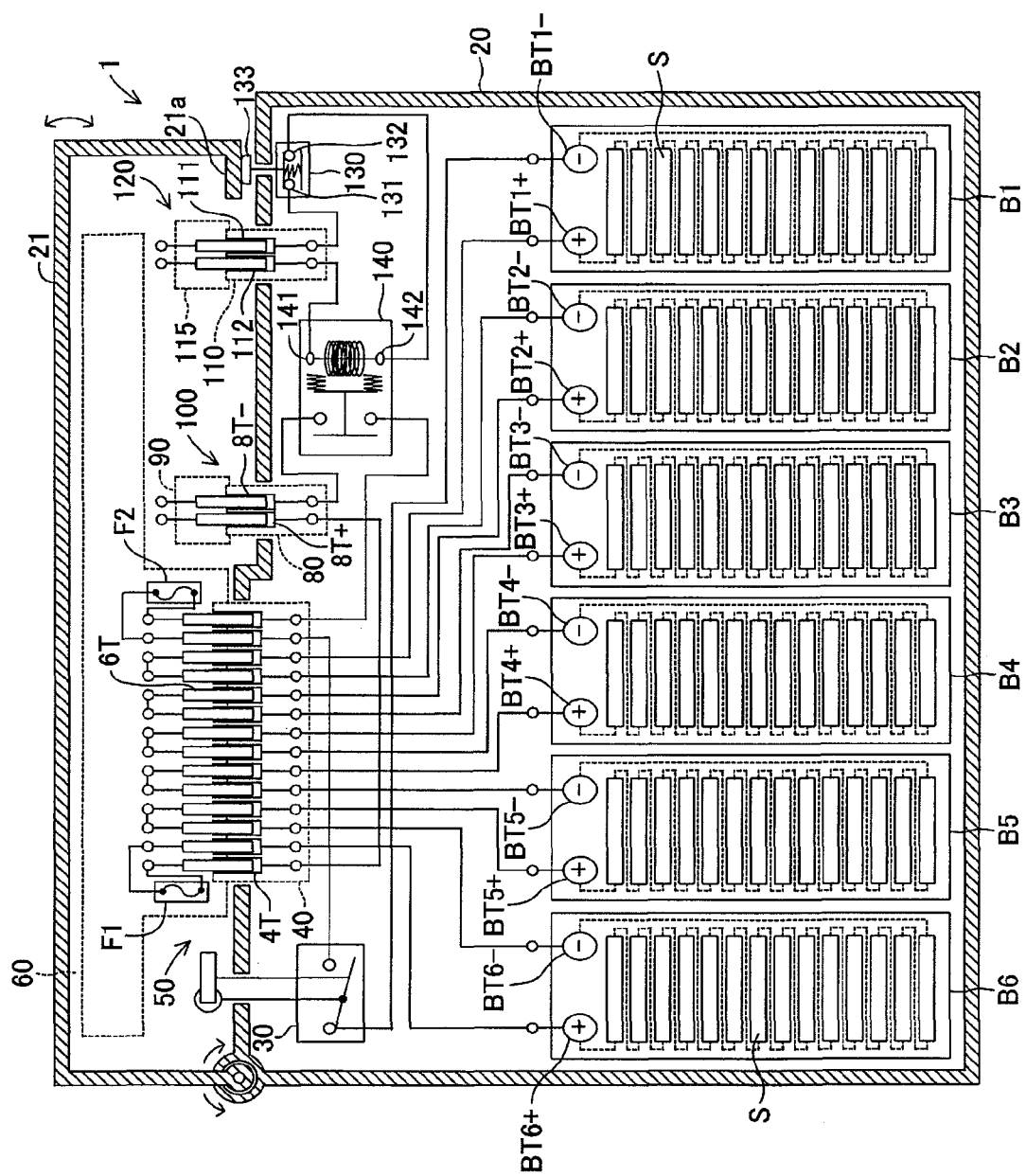

[FIG. 3]
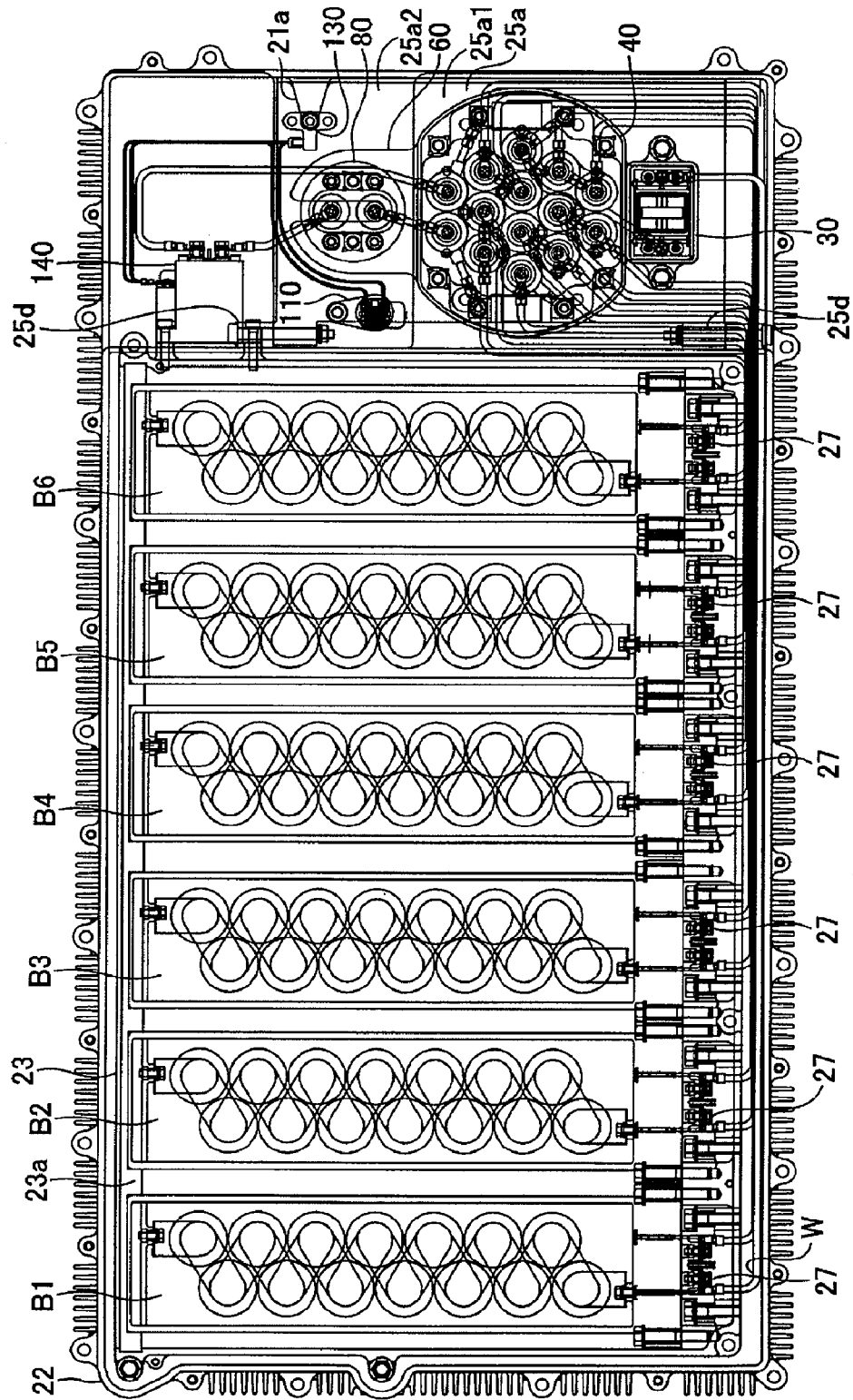

[FIG. 4]
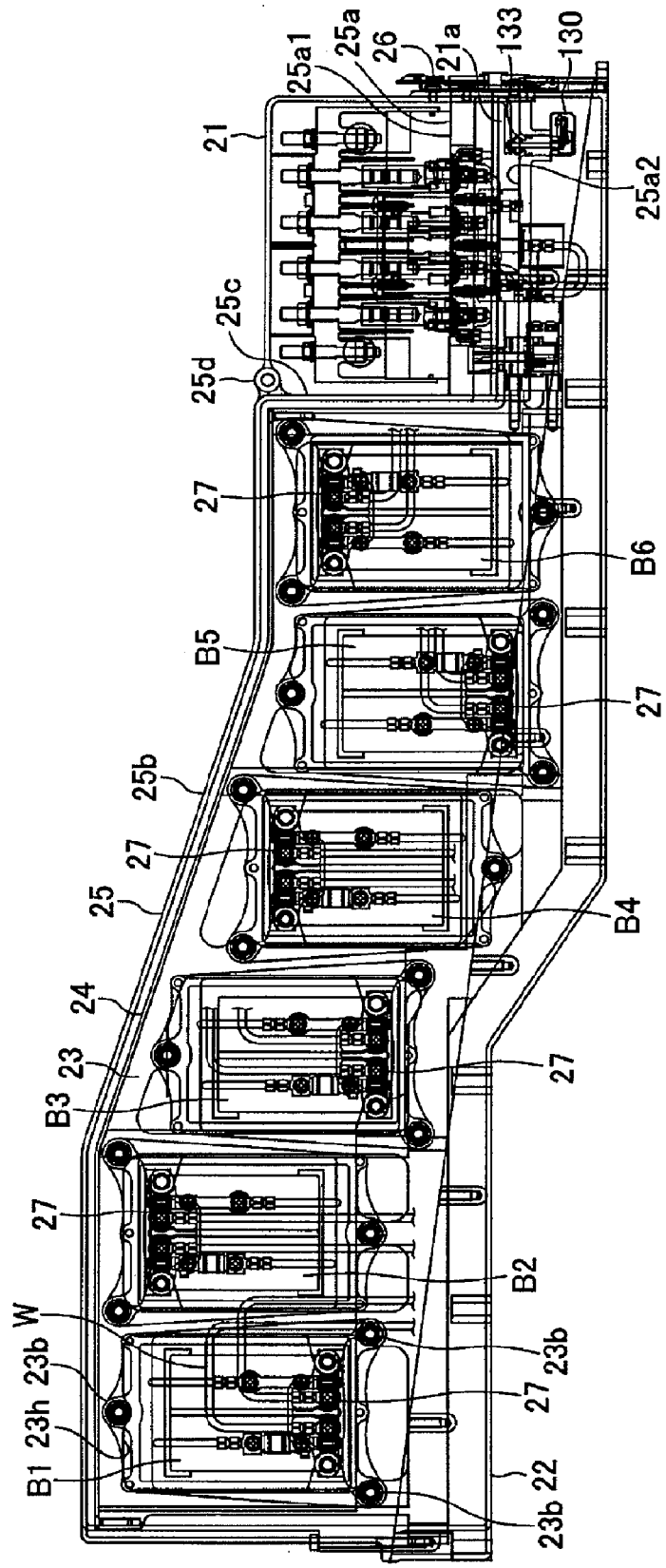

[FIG. 5]
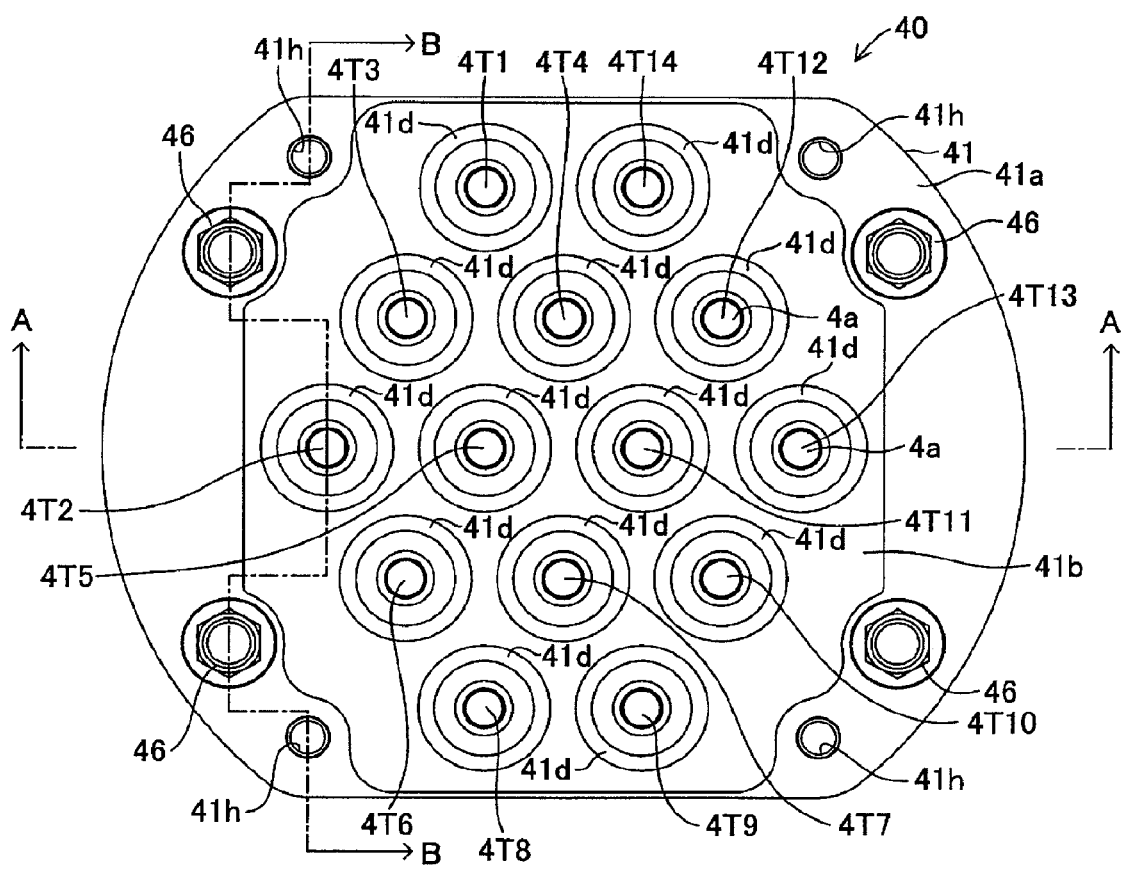

[FIG. 6]
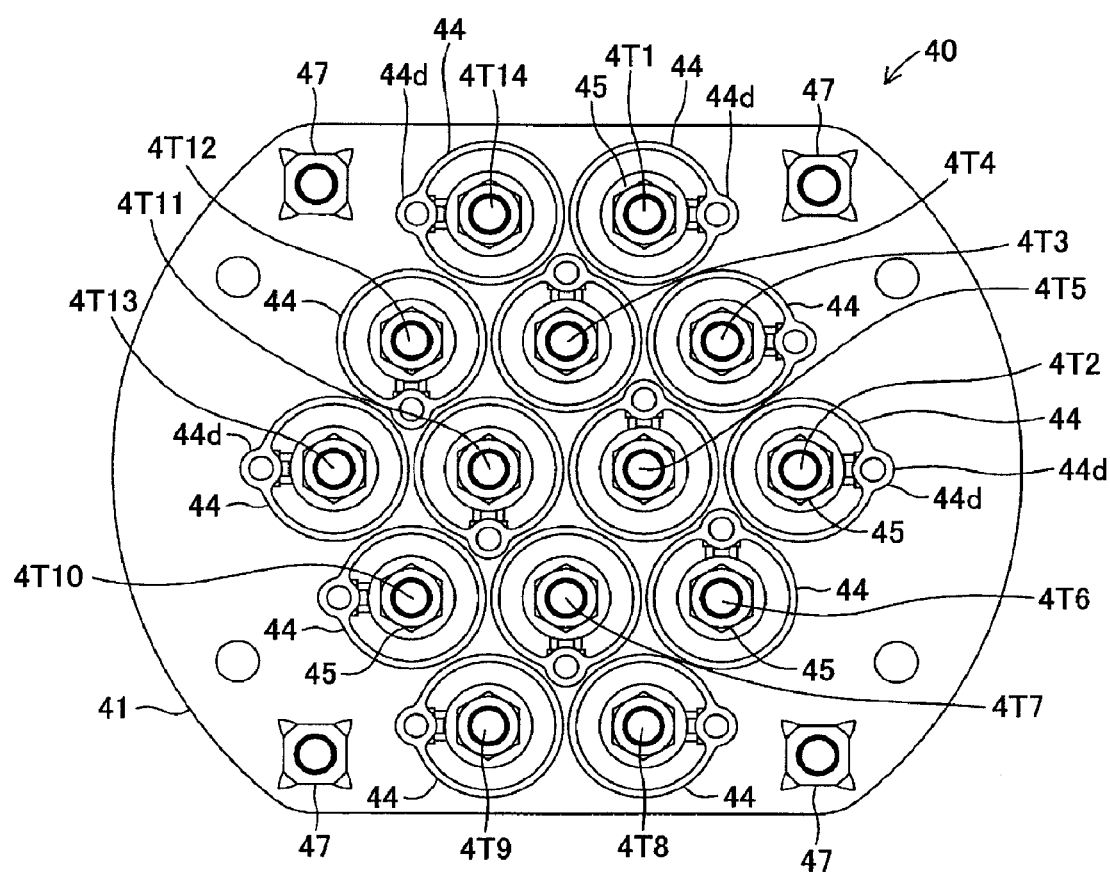

[FIG. 7]
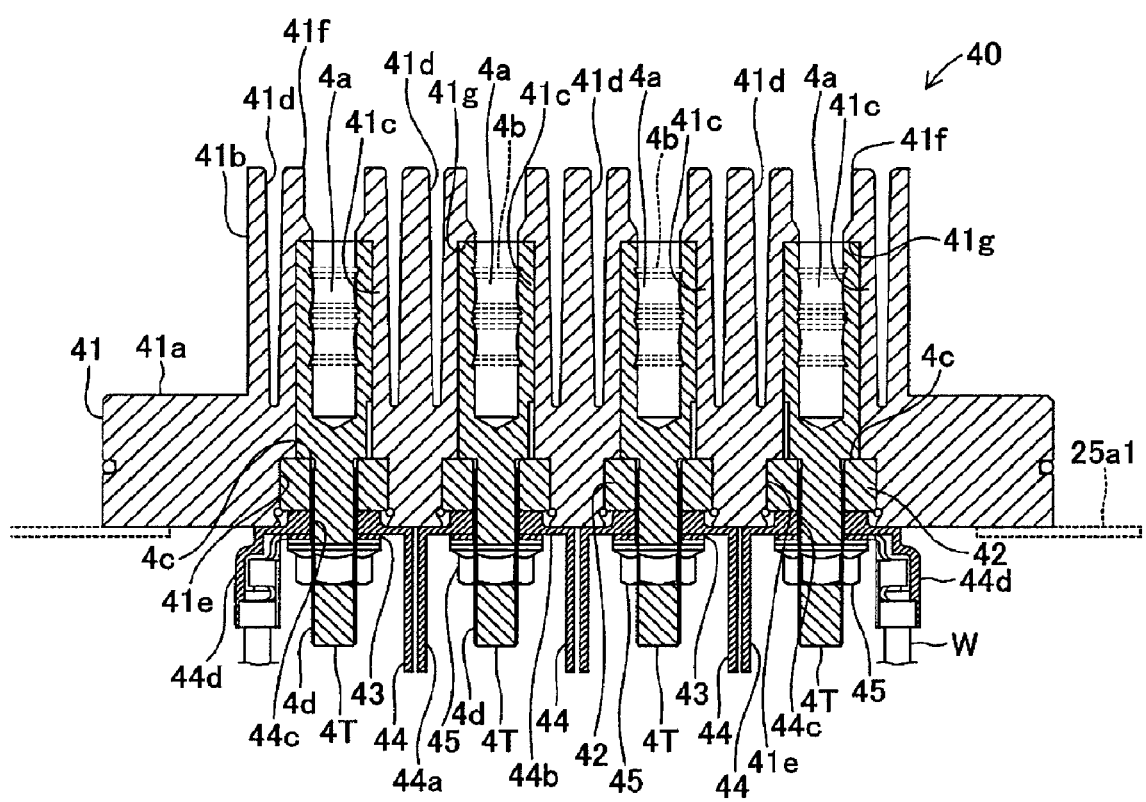

[FIG. 8]
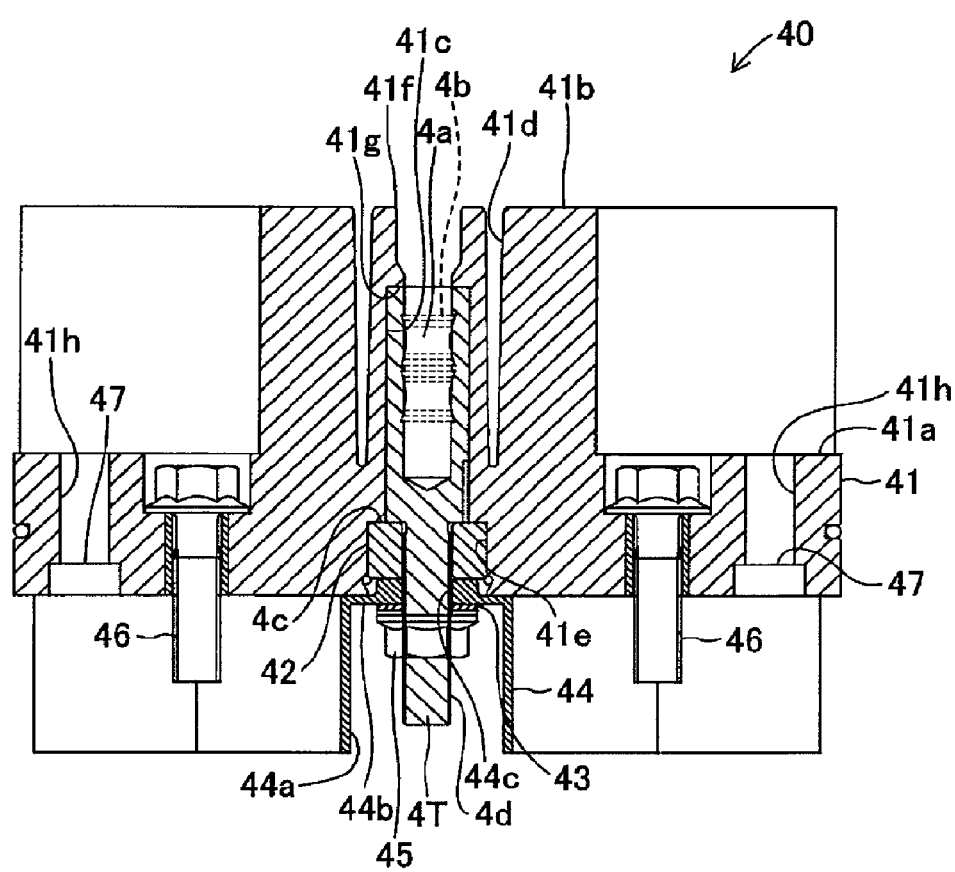

[FIG. 9]
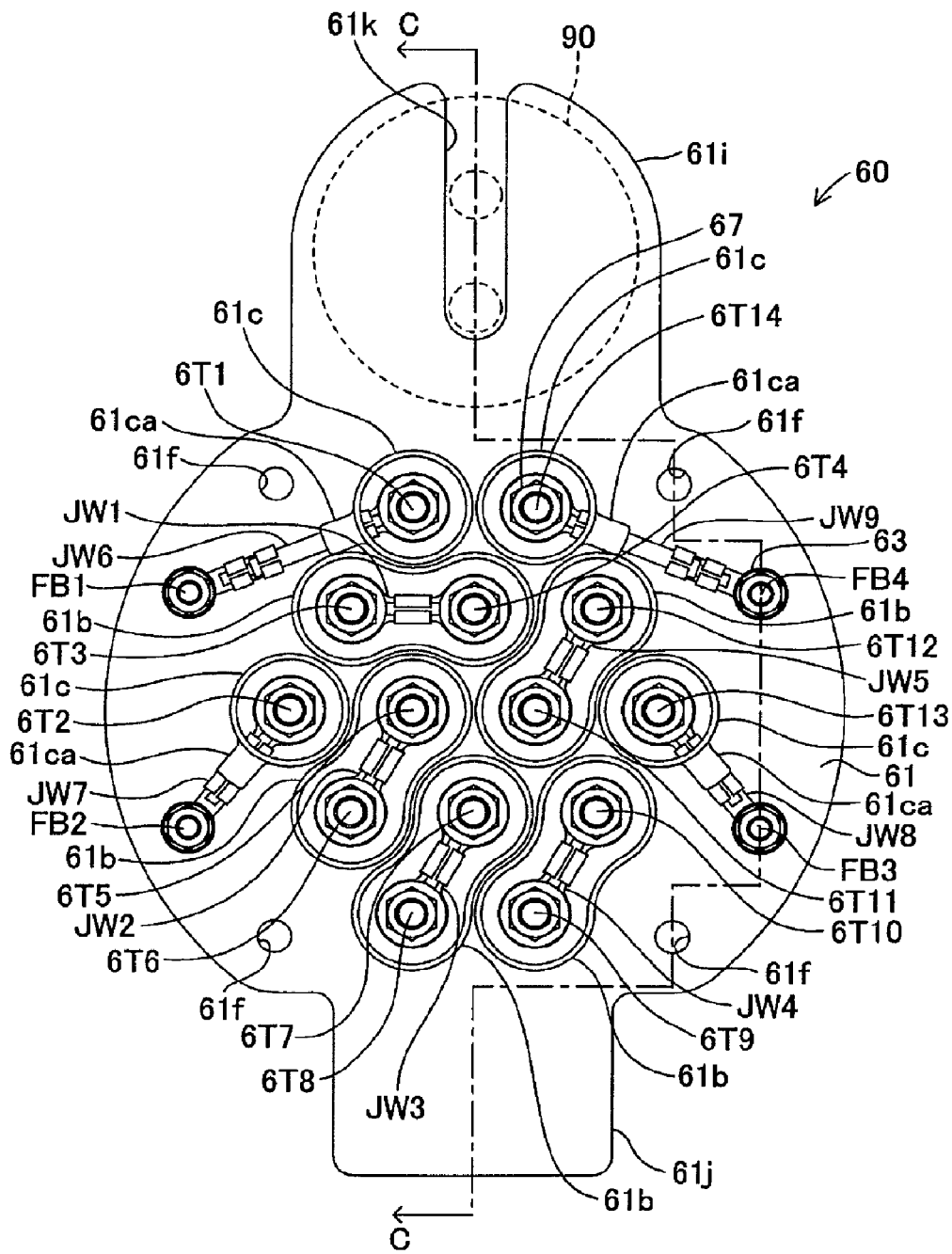

[FIG. 10]
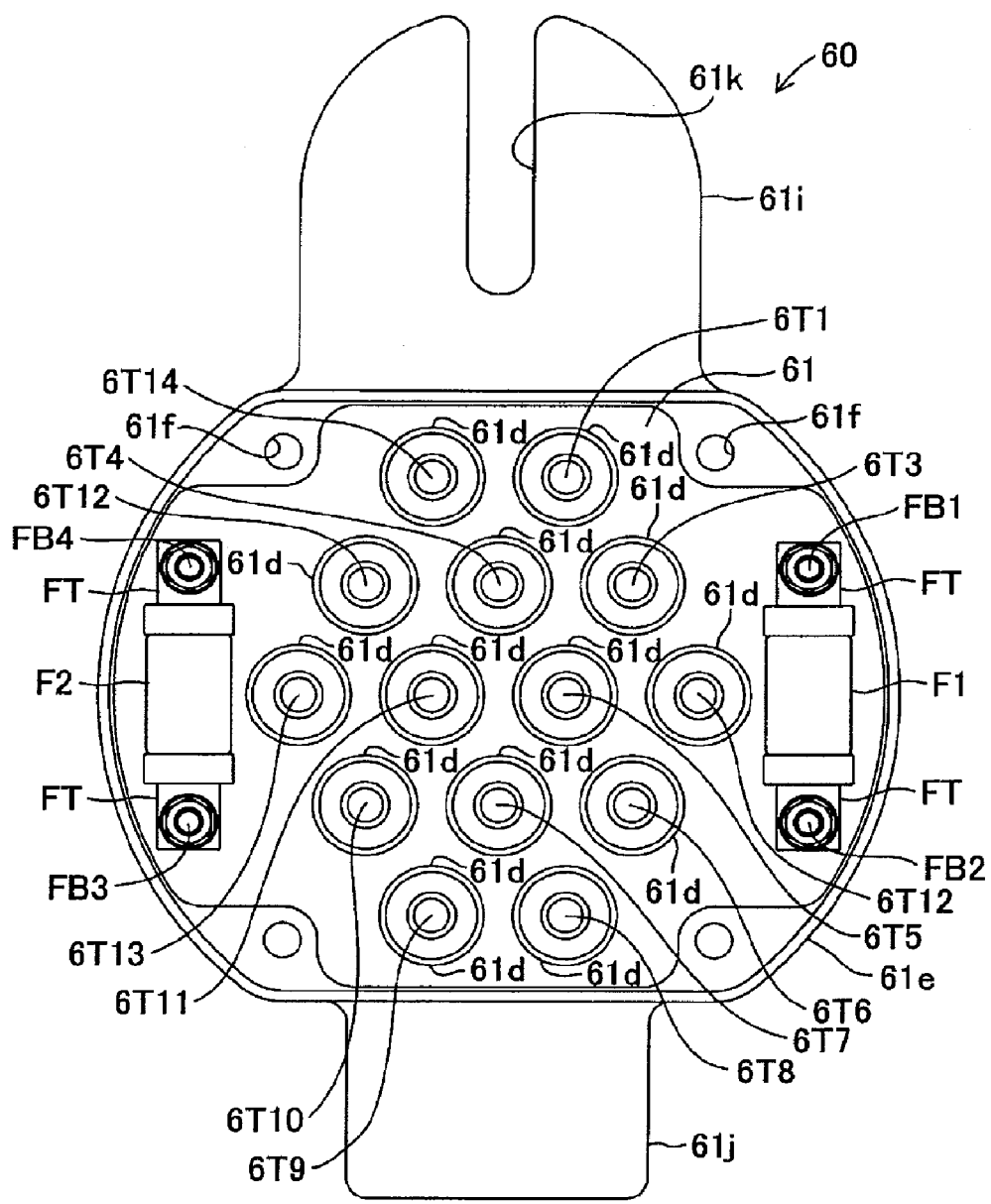

[FIG. 11]
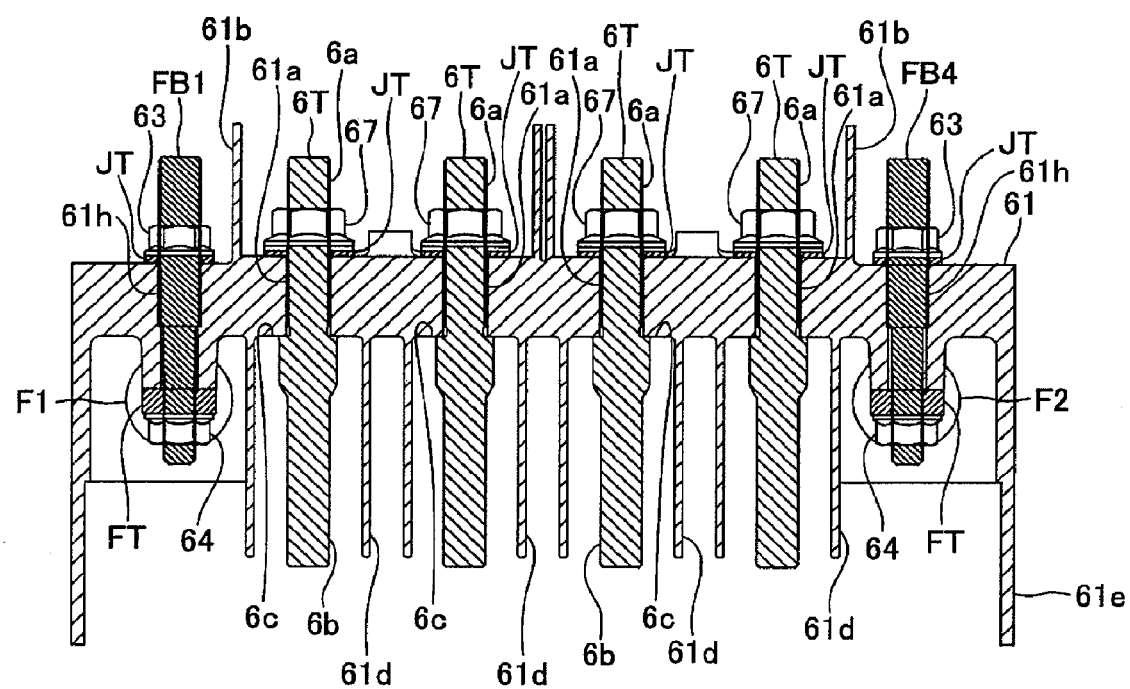

[FIG. 12]
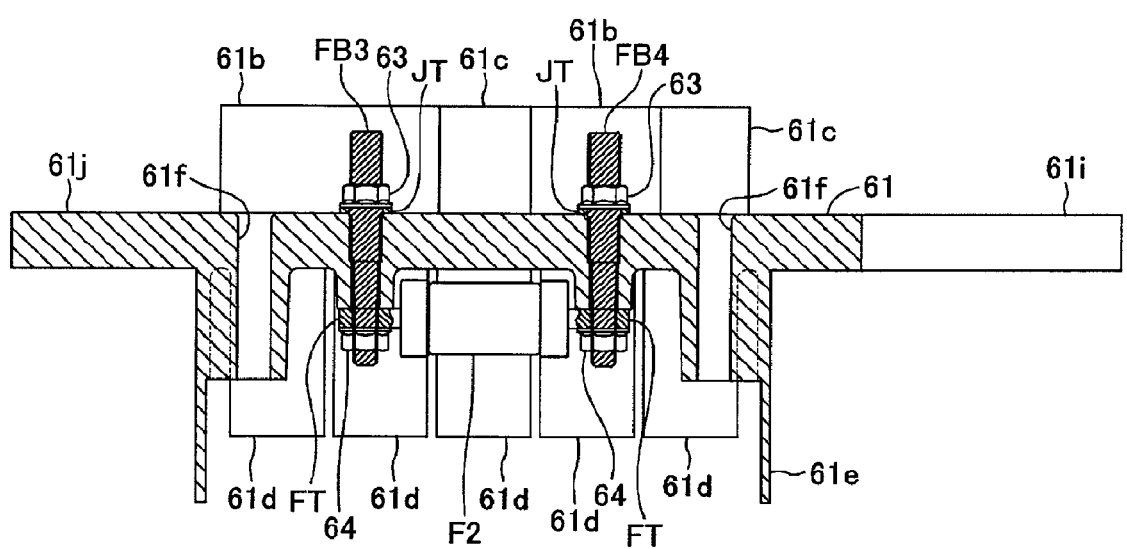

[FIG. 13]
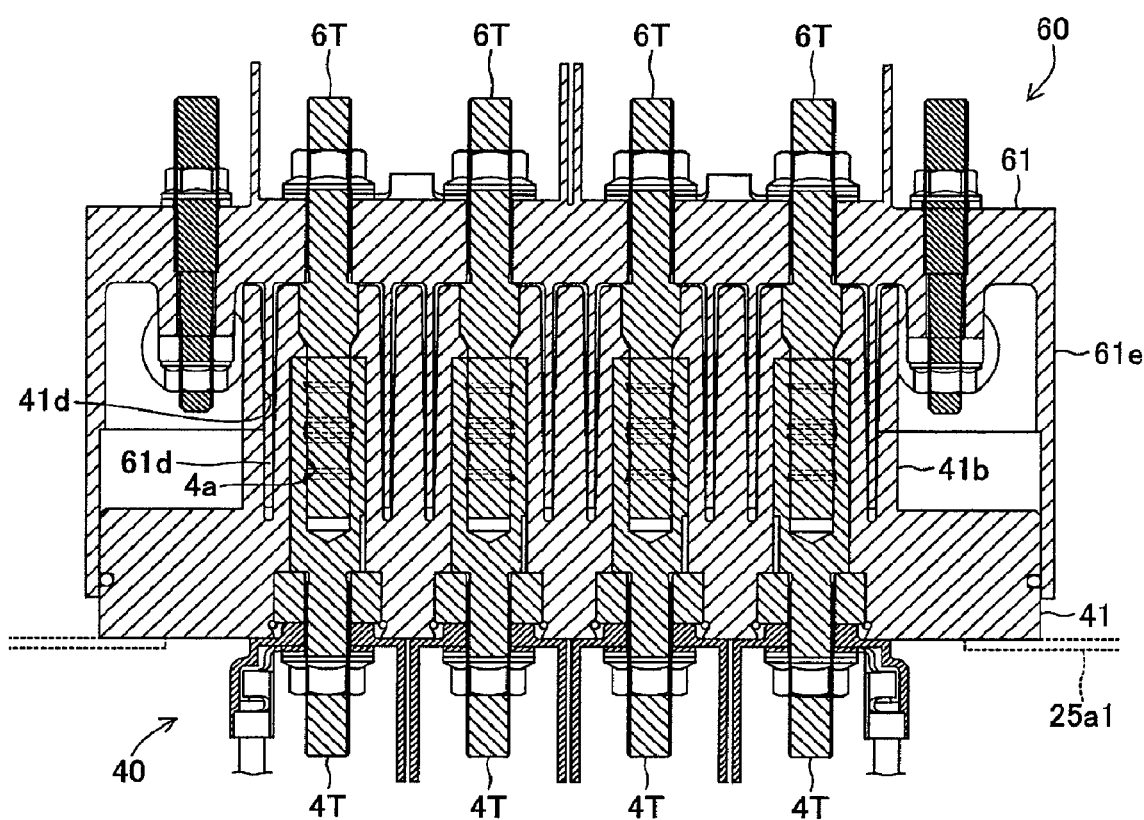

[FIG. 14]
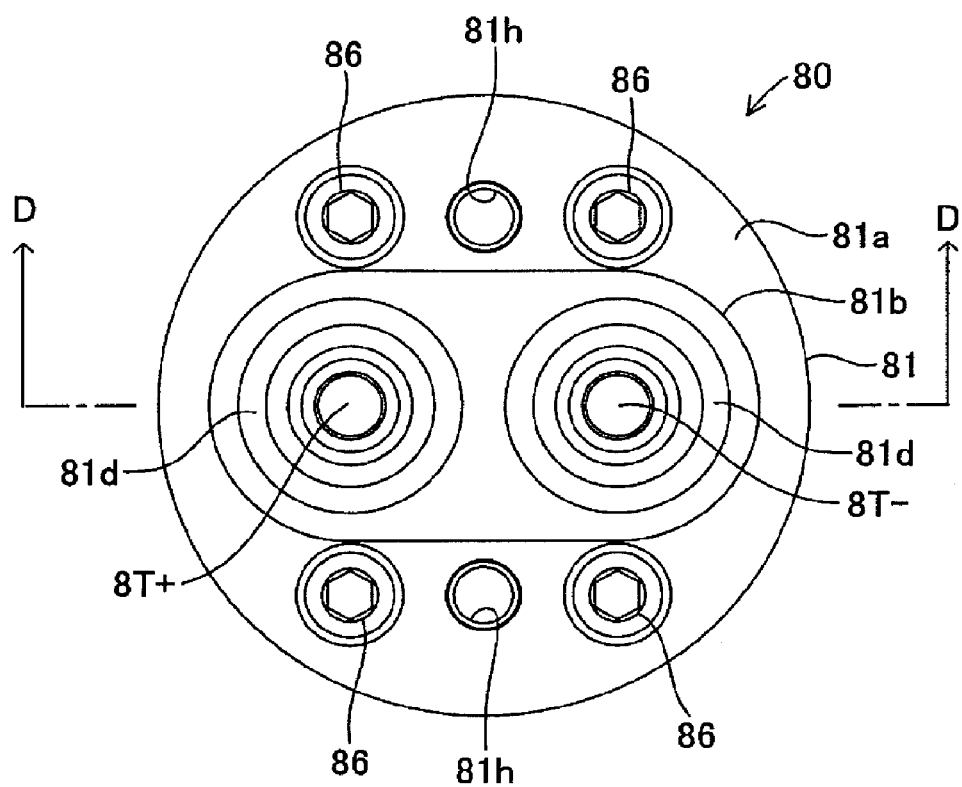

[FIG. 15]
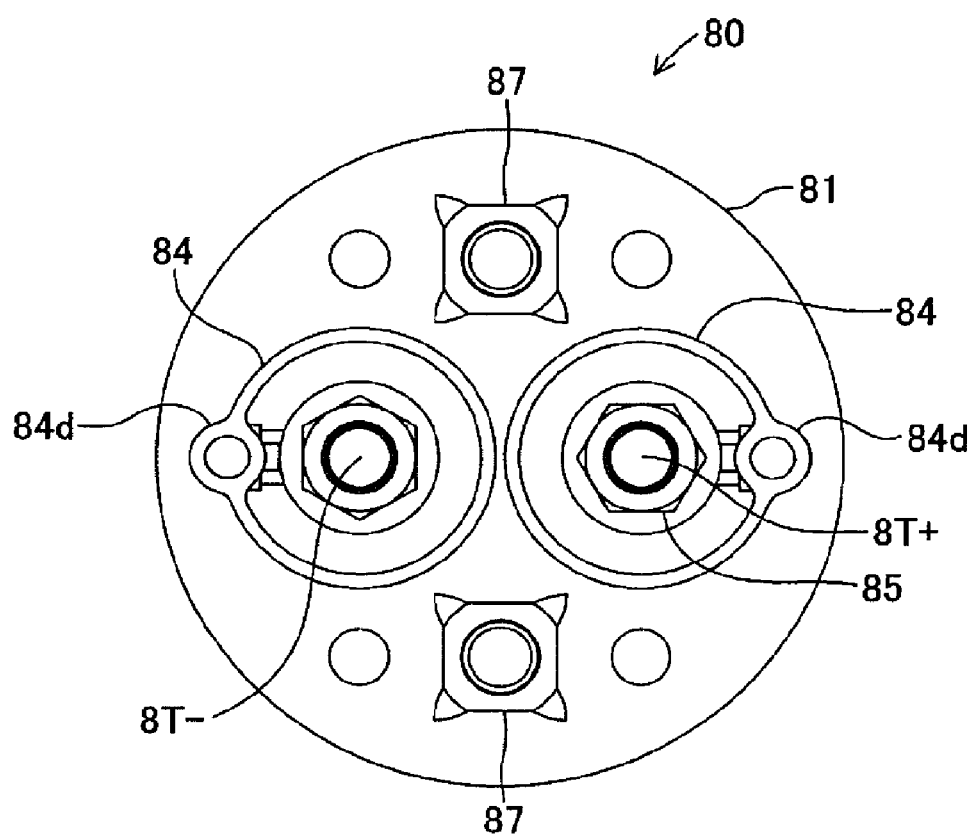

[FIG. 16]
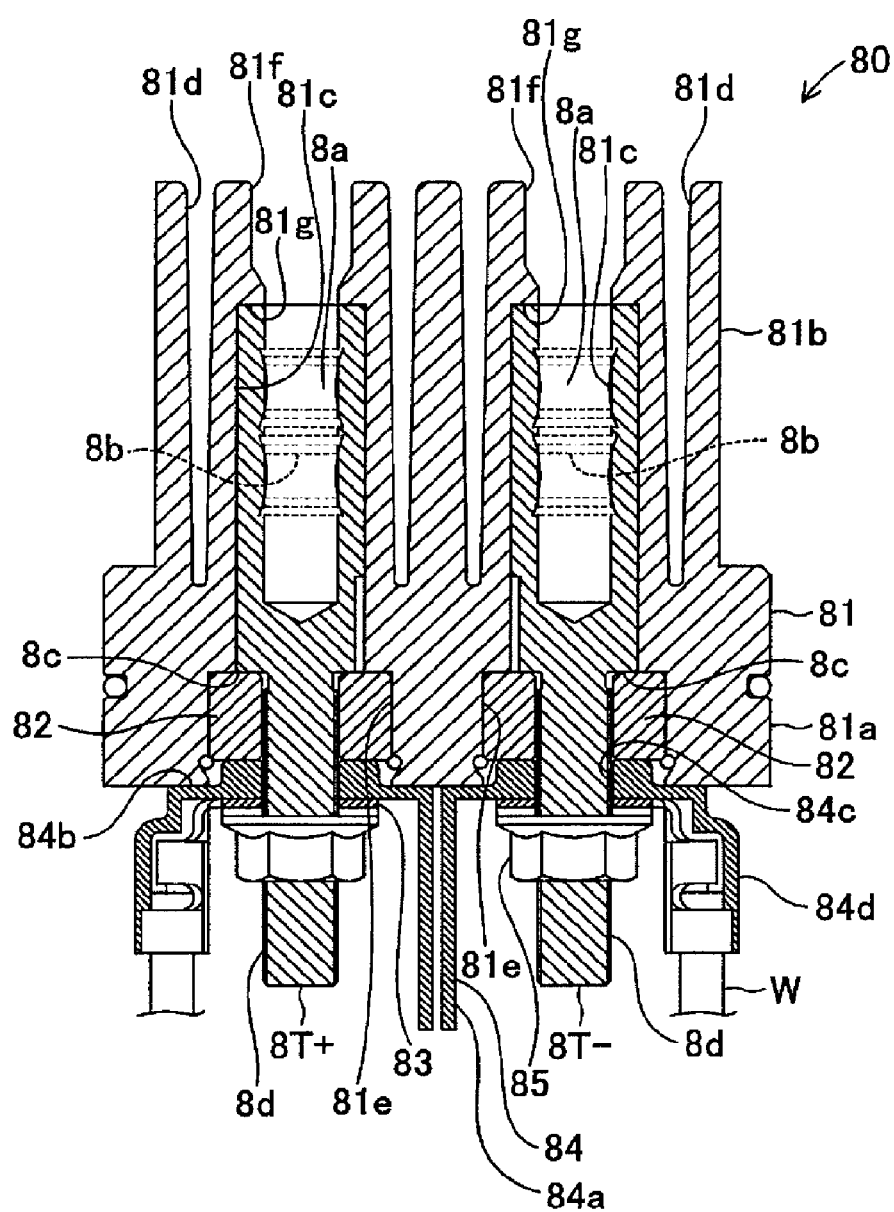

[FIG. 17]
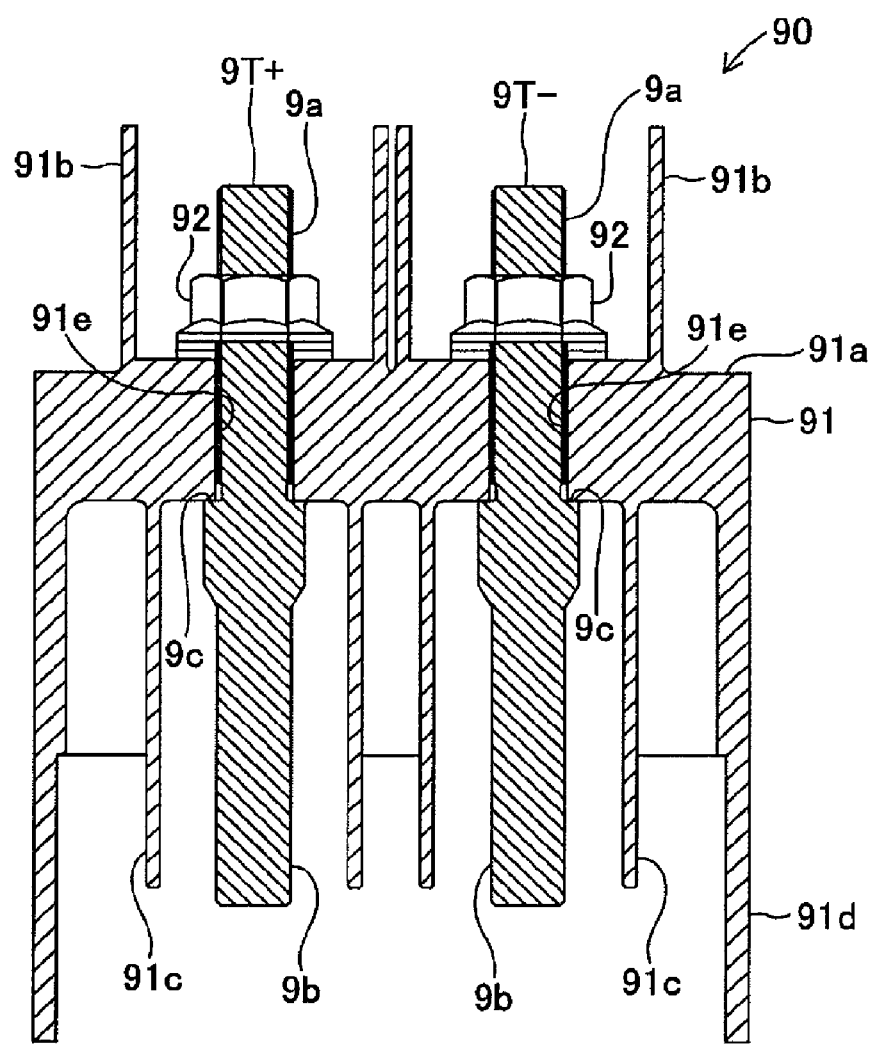

[FIG. 18]
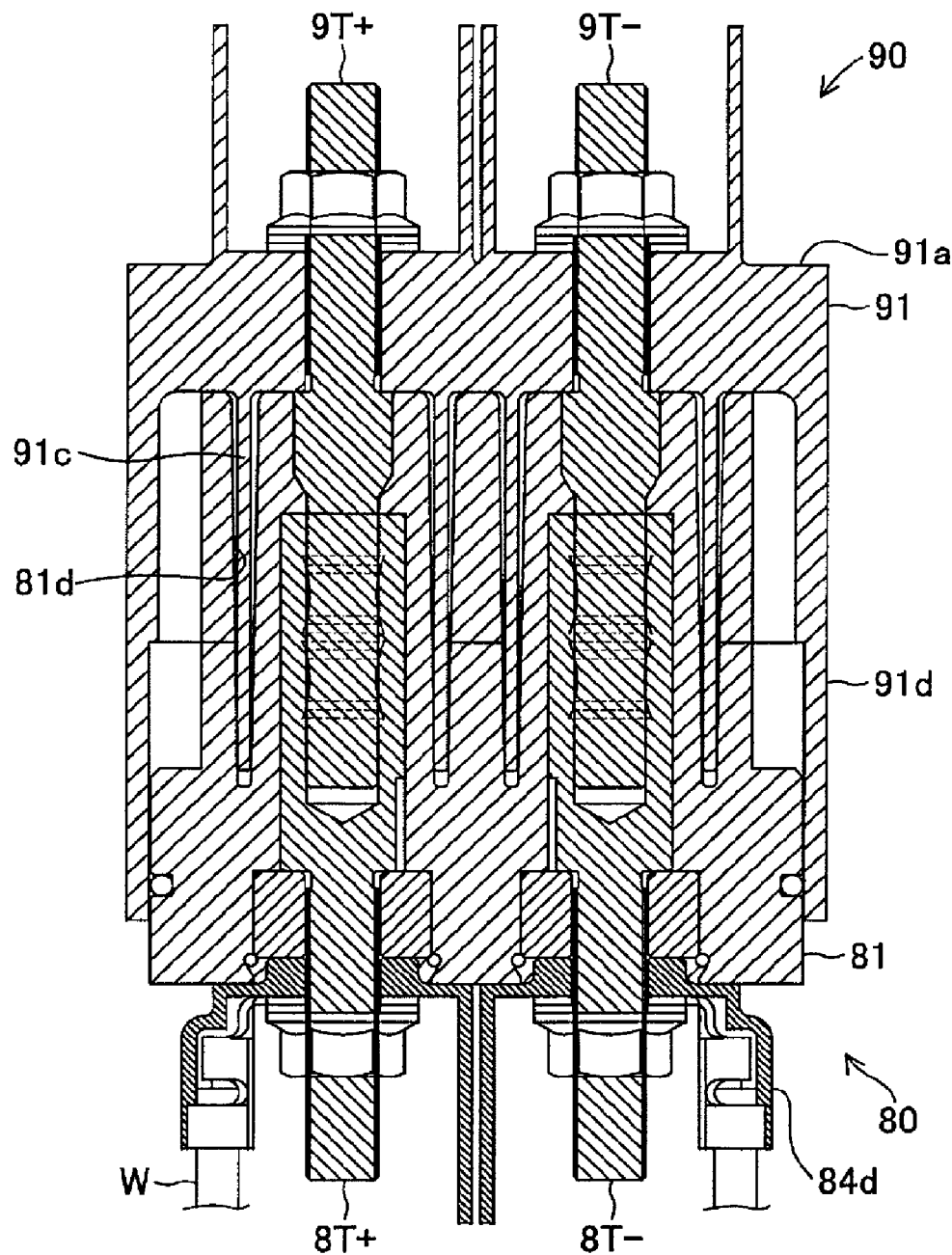

[FIG. 19]
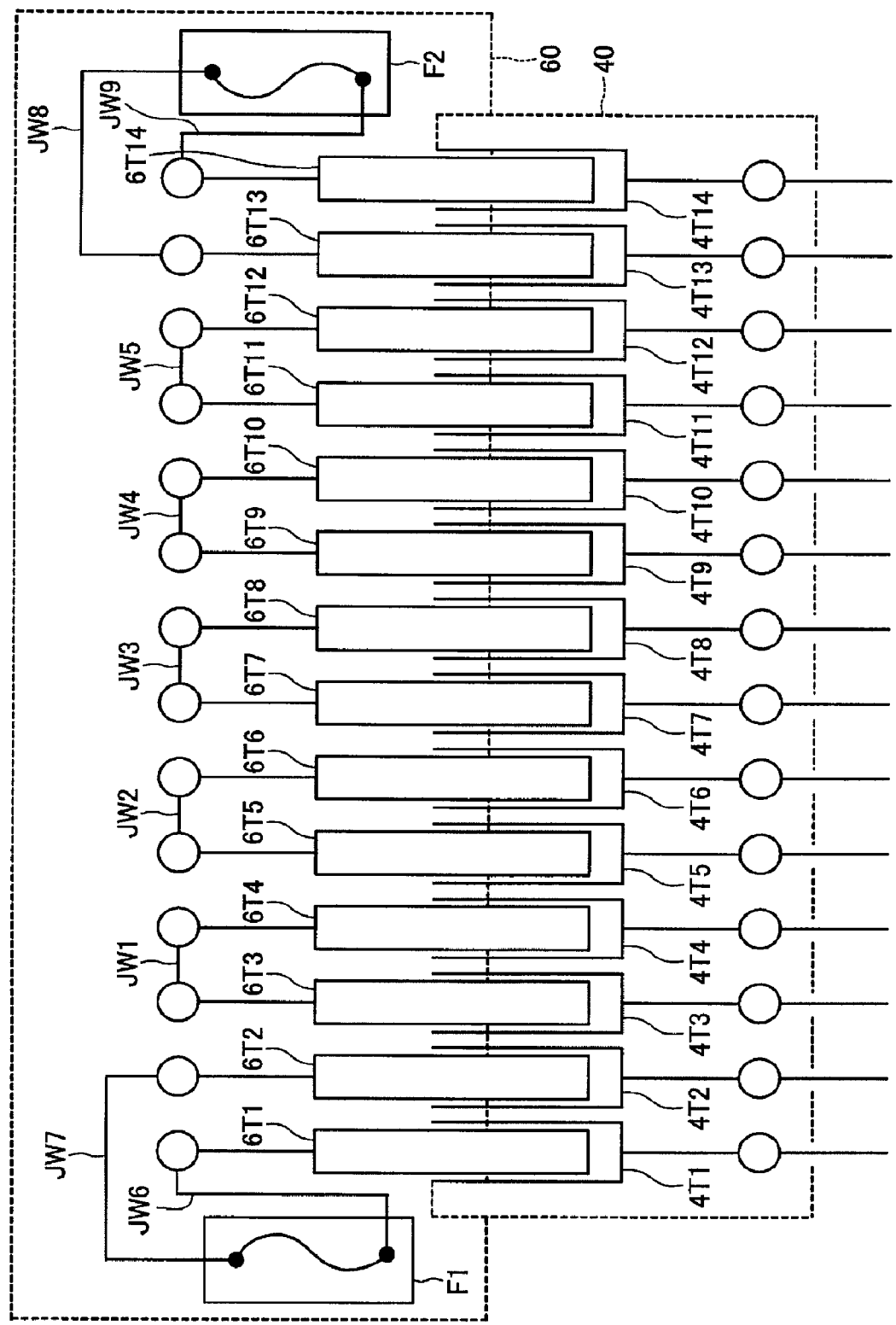

POWER SUPPLY DEVICE FOR A VEHICLE

CROSS-REFERENCE TO RELATED APPLICATIONS

The present application is based on and claims priority under 35 U.S.C. §119 to Japanese Patent Application No. 2006-075500, filed on Mar. 17, 2006, the entire contents of which are expressly incorporated by reference herein.

BACKGROUND OF THE INVENTION

1. Field of the Invention

This invention relates to a high voltage power supply device for a vehicle such as, for example, a hybrid vehicle or an electric vehicle which are driven at least in part by an electric motor. Although not limited thereto, the invention has applicability to two-wheeled vehicles.

2. Description of the Related Art

Conventional electric automobiles run using an electric motor driven by electric power from batteries. Conventional hybrid vehicles in turn run using a combination of a gasoline engine and an electric motor. In such vehicles, a power supply battery device is required to supply high voltage for operating an electric motor so as to efficiently generate high output.

Regarding vehicles that use a high voltage power supply battery device, it is conventional to incorporate a safety plug unit that mechanically opens a high voltage circuit for inspection and maintenance.

For example, in Japanese publication no. JP 2004-007919, a removable safety plug is placed in the middle of a circuit connecting multiple batteries to each other in series. When the safety plug is removed from a battery container housing the batteries, the battery series circuit is mechanically disconnected.

Specifically, JP 2004-007919 discloses a power supply device in which twelve batteries each having 24V are connected to each other in series to generate voltage of 288V. A safety plug is placed in the middle of the series connection, i.e., at a connecting portion between the sixth battery and the seventh battery (a first embodiment). Also, a second embodiment suggests a structure in which plug electrodes are placed at three portions in the middle of a battery series circuit having 12 batteries, i.e., a safety plug structure in which plug electrodes are placed every three batteries.

However, the structure disclosed in JP 2004-007919 lacks safety. That is, even though the safety plug is removed from the battery containing box to disconnect the battery series circuit, voltage of 144V (i.e., 288/2) is still applied to an electrode section of the battery container into which the safety plug is inserted. Also, in the second embodiment, a voltage of 72V (i.e., 288/4) is applied to the electrode section. In general, resistance of a human body can be 3-5K$_o$, and a current amount that affects the human body can be 10 mA.

Accordingly, a voltage of 50V (0.01 A×5000$_o$) can be a criterion for a safe voltage exposure for human beings. Therefore, a further reduction of the voltage is required than provided in the structure of JP 2004-007919.

Because the plug electrodes are inserted every three batteries of a battery line which is arranged in line in the second embodiment of JP 2004-007919 that has multiple safety plugs, intervals between three plug electrodes are inevitably large. If, the three plug electrodes need to be inserted simultaneously, the size of the safety plug itself would need to be increased.

SUMMARY OF THE INVENTION

In view of the circumstances noted above, an aspect of at least one of the embodiments disclosed herein is to improve a power supply device having a safety plug and also to downsize the safety plug.

In accordance with one aspect of the invention, a power supply device for a vehicle is provided. The power supply device comprises a plurality of batteries, and a battery container for housing the plurality of batteries. The power supply device also comprises a safety plug unit connecting base having a plurality of plug connective plus electrodes, each plus electrode electrically connected to a plus terminal of the respective battery through a wiring, and a plurality of plug connective minus electrodes, each minus electrode electrically connected to a minus terminal of the respective battery through a wiring, the plug connective plus electrodes and the plug connective minus electrodes being disposed outside of the battery container. The power supply device further comprises a safety plug unit having coupling electrodes that are removably coupleable with the safety plug unit connecting base and that, while being coupled therewith, electrically connects the plug connective plus electrodes and the plug connective minus electrodes and connects the plurality of batters in series to form a power supply circuit and output a voltage from a power supply output section. The plug connective plus electrodes and the plug connective minus electrodes are configured to connect the plus terminals and the minus terminals that define series connective terminals between the batteries via wirings, and the safety plug unit is configured to disconnect the batteries from each other when the safety plug unit is decoupled from the safety plug unit connecting base.

In accordance with another aspect of the invention, a power supply device for a vehicle is provided. The power supply device comprises a plurality of batteries, a container housing the plurality of batteries, and a safety plug unit base having a plurality of plus and minus electrodes electrically connected to the plurality of batteries, each plus electrode electrically connected to a plus terminal of the respective battery, each minus electrode electrically connected to a minus terminal of the respective battery, the plus and minus electrodes disposed outside of the container. The power supply device also comprises a safety plug unit having coupling electrodes that are removably coupleable with the safety plug unit base to electrically connect the plus electrodes and the minus electrodes to connect the plurality of batteries in series to form a power supply circuit configured to output a voltage from a power supply output section, the safety plug unit configured to disconnect the batteries from each other upon decoupling of the safety plug unit from the safety plug unit base.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 19 figures.

FIG. 1 is a schematic side elevational view showing a hybrid type motorcycle that has a power supply unit configured in accordance with one embodiment of the present invention.

FIG. 2 is a system block diagram of one embodiment of the power supply device.

FIG. 3 is a plan perspective schematic view of the power supply device, according to one embodiment.

FIG. 4 is a side elevational schematic view of the power supply device.

FIG. 5 is a schematic plan view showing a top surface of a safety plug unit connecting base.

FIG. 6 is a schematic bottom plan view showing a bottom surface of a safety plug unit connecting base.

FIG. 7 is a schematic cross-sectional view of the safety plug unit taken along the line A-A of FIG. 5.

FIG. 8 is a schematic cross sectional view of the safety plug taken along the line B-B of FIG. 5.

FIG. 9 is a schematic plan view showing a top surface of another embodiment of a safety plug unit.

FIG. 10 is a schematic bottom plan view showing a bottom surface of the safety plug unit in FIG. 9.

FIG. 11 is a schematic cross sectional view of the safety plug unit of FIG. 9 with male electrode bodies attached thereto.

FIG. 12 is a schematic cross sectional view taken along the line C-C of FIG. 9.

FIG. 13 is a schematic cross sectional view showing female electrode bodies and the male electrode bodies coupled with each other in the safety plug device.

FIG. 14 is a schematic plan view showing a top surface of a power supply output base.

FIG. 15 is a schematic bottom plan view showing a bottom surface of a power supply output base.

FIG. 16 is a schematic cross sectional view taken along the line D-D of FIG. 14.

FIG. 17 is a schematic cross-sectional view of a power supply output coupler.

FIG. 18 is a schematic cross sectional view showing the female electrode bodies and the male electrode bodies coupled with each other in the power supply output coupler.

FIG. 19 is a block diagram showing wiring connections for one embodiment of the safety plug device.

DETAILED DESCRIPTION OF THE PREFERRED EMBODIMENT

In the following detailed description, terms of orientation such as "right," "left," "front," "rear," "frontward," and "rearward" are used herein to simplify the description of the context of the illustrated embodiments. Moreover, left, right, front and rear directions are described hereinbelow as directions as seen from a driver seated on a seat of a vehicle, such as a motorcycle. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

FIG. 1 shows one embodiment of a hybrid type motorcycle 10. This hybrid type motorcycle has a front wheel 11a and a rear wheel 11b. A drive unit DY can be disposed in a center lower portion of a vehicle body 12 defined between the front wheel 11a and the rear wheel 11b. A power supply device 1 can be disposed above the rear wheel 11b and in a rear portion of the vehicle body 12. Handlebars 13 having an acceleration grip and a brake (not shown) are disposed in a front upper portion of the vehicle body 12. A seat 14 extends from a center upper portion to a rear upper portion of the vehicle body 12. The shape of the motorcycle 10 is not limited to that shown in FIG. 1, nor are other conditions of the vehicle limited thereto. Additionally, the inventions disclosed herein are not limited to a so-called motorcycle-type two-wheel vehicle, but are applicable to other types of two-wheel vehicles. Moreover, the inventions disclosed herein are not limited to two-wheel vehicles, but may be used with other types of straddle-type vehicle. Furthermore, some aspects of the inventions disclosed herein are not limited to straddle-type vehicles, but can also be used with vehicles with side-by-side seating.

The drive unit DY has an engine, a power distribution device, a generator and an electric motor (not shown). The hybrid type motorcycle 10 can be constructed in such a manner that the engine and the electric motor, both of which are power sources, are individually operated or are operated in combination to drive the drive wheel (e.g., the rear wheel 11b).

The power supply device 1 is an electric power supply source for supplying electric power to the electric motor. Electric power generated by the generator can be charged into the power supply device 1 when a battery capacity is insufficient.

FIG. 2 is a system block diagram of the power supply device 1. FIG. 3 is a schematic plan perspective view of the power supply device 1. FIG. 4 is a schematic side perspective view of the power supply device 1.

First, an electrical circuit structure of the power supply 1 device will be described with reference to FIG. 2.

This power supply device 1 includes six battery modules B1, B2, B3, B4, B5, B6 in a battery containing box 20. However, the power supply device 1 can include any suitable number of battery modules. Each battery module B1, B2, B3, B4, B5, B6 has fourteen lithium battery cells S (e.g., with a single cell voltage=3.4V) connected to each other in series and contained in a package (packaged) and each output voltage can be set to be 48V. In other embodiments, the battery module can include more or fewer battery cells, which need not be lithium battery cells. Hereunder, the battery modules B1, B2, B3, B4, B5, B6 will be simply called "battery module B" except for an occasion such that specific one needs to be identified. Additionally, this battery module B corresponds to the battery of the present invention.

In the illustrated embodiment, the battery containing box or container 20 has, other than the six battery modules B, a breaker 30 (e.g., a protective device against excessive current), a safety plug unit connecting base 40, a power supply output base 80, a signal input base 110, a relay 140 and a micro-switch 130.

A safety plug unit 60 is removably coupled with the safety plug unit connecting base 40 from a location above the base 40 to form an electric power supply circuit in which the six battery modules B are connected to each other in series when the safety plug unit 60 is coupled to the connecting base 40. Hereunder, the term "safety plug device 50" will be used to include both the safety plug unit connecting base 40 and the safety plug unit 60.

With continued reference to the embodiment in FIG. 2, the power supply output base 80 is a power supply output section that supplies the battery power to the vehicle loads (e.g., electric motor). A power supply output coupler 90 is removably coupled with the power supply output base 80. Hereunder, the term "power supply coupler device 100" will be used to include both the power supply output base 80 and the power supply output coupler 90.

Additionally, the power supply output base 80 not only acts as the output section of the battery power source but also acts as an input section through which the power generated by the generator (not shown) is input to, for example, charge the battery module B.

The signal input base 110 is an input section through which the ON signal of an ignition key (not shown) of the vehicle is input. A signal input coupler 115 is removably coupled with the signal input base 110. Hereunder, the term "signal coupler device 120" will be used to include both the signal input base 110 and the signal input coupler 115.

A safety plug unit open/close cover 21 can be attached to the battery containing box 20 for movement between an open position and a close position to cover the breaker 30, the safety plug device 50, the power supply coupler device 100 and the signal coupler device 120.

The micro-switch 130 has contact points that are connected when the safety plug unit open/close cover 21 is in the fully closed position, and that are disconnected when the safety plug unit open/close cover 21 is in the open position.

As shown in FIG. 19, the safety plug unit connecting base 40 can have fourteen female electrode bodies 4T1, 4T2, 4T3, 4T4, 4T5, 4T6, 4T7, 4T8, 4T9, 4T10, 4T11, 4T12, 4T13, 4T14. FIG. 19 identifies individual electrodes of the safety plug device 50 of FIG. 2 with electrode numbers. The order of the electrodes in the circuit is the same as that shown in FIG. 2.

Additionally, if the fourteen female electrode bodies 4T1, 4T2, 4T3, 4T4, 4T5, 4T6, 4T7, 4T8, 4T9, 4T10, 4T11, 4T12, 4T13, 4T14 do not need to be individually identified, they are simply called "female electrode body 4T."

The female electrode body 4T1 of the safety plug unit connecting base is connected to a plus female electrode body 8T+ of the power supply output base 80. The female electrode body 4T2 is connected to a plus power supply terminal BT6+ of the sixth battery module B6. The female electrode body 4T3 is connected to a minus power supply terminal BT6− of the sixth battery module B6. The female electrode body 4T4 is connected to a plus power supply terminal BT5+ of the fifth battery module B5. The female electrode body 4T5 is connected to a minus power supply terminal BT5− of the fifth battery module B5. The female electrode body 4T6 is connected to a plus power supply terminal BT4+ of the fourth battery module B4. The female electrode body 4T7 is connected to a minus power supply terminal BT4− of the fourth battery module B4. The female electrode body 4T8 is connected to a plus power supply terminal BT3+ of the third battery module B3. The female electrode body 4T9 is connected to a minus power supply terminal BT3− of the third battery module B3. The female electrode body 4T10 is connected to a plus power supply terminal BT2+ of the second battery module B2. The female electrode body 4T11 is connected to a minus power supply terminal BT2− of the second battery module B2. The female electrode body 4T12 is connected to a plus power supply terminal BT1+ of the first battery module B1.

The female electrode body 4T13 is connected to a minus power supply terminal BT1− of the first battery module B1 through the breaker 30. The female electrode body 4T14 is connected to a minus female electrode body 8T− of the power supply output base 80 through the relay 140.

Additionally, the female electrode bodies 4T2, 4T4, 4T6, 4T8, 4T10, 4T12 correspond to the plug connective plus electrodes. Also, the female electrode bodies 4T3, 4T5, 4T7, 4T9, 4T11, 4T13 correspond to the plug connective minus electrodes.

The power supply output base 80 has a plus female electrode body 8T+ and a minus female electrode body 8T−. As discussed above, the plus female electrode body 8T+ is connected to the female electrode body 4T1 of the safety plug unit connecting base 40, while the minus female electrode body 8T− is connected to the female electrode body 4T14 of the safety plug unit connecting base 40 through the relay 140.

Additionally, all of those connections are made using wiring cables W which are applied for power supply.

As illustrated in the embodiment of FIG. 2, the signal input base 110 can have two female input terminals 111, 112. One female input terminal 111 is connected to one terminal 131 of the micro-switch 130, while the other input terminal 112 is connected to a signal line terminal 141 of the relay 140. The other terminal 132 of the micro-switch 130 is connected to the other signal line terminal 142 of the relay 140. Accordingly, the ON signal of the ignition key is input through the signal input coupler 115. In addition, when the micro-switch 130 is in the ON state, the contacts of the relay 140 are connected to each other.

As shown in FIG. 19, the safety plug unit 60 coupled with the safety plug unit connecting base 40 has male electrode bodies 6T1, 6T2, 6T3, 6T4, 6T5, 6T6, 6T7, 6T8, 6T9, 6T10, 6T11, 6T12, 6T13, 6T14 corresponding to the female electrode bodies 4T1, 4T2, 4T3, 4T4, 4T5, 4T6, 4T7, 4T8, 4T9, 4T10, 4T11, 4T12, 4T13, 4T14 of the safety plug unit connecting base 40 and sized to fit into them.

Additionally, if the fourteen male electrode bodies 6T1, 6T2, 6T3, 6T4, 6T5, 6T6, 6T7, 6T8, 6T9, 6T10, 6T11, 6T12, 6T13, 6T14 do not need to be individually identified, they are simply called "male electrode body 6T."

The male electrode body 6T1 and the male electrode body 6T2 of the safety plug unit 60 are connected to each other through jumper wirings JW6, JW7 via a fuse F1. Also, the male electrode body 6T3 and the male electrode body 6T4 are connected to each other through a jumper wiring JW1. The male electrode body 6T5 and the male electrode body 6T6 are connected to each other through a jumper wiring JW2. The male electrode body 6T7 and the male electrode body 6T8 are connected to each other through a jumper wiring JW3. The male electrode body 6T9 and the male electrode body 6T10 are connected to each other through a jumper wiring JW4. The male electrode body 6T11 and the male electrode body 6T12 are connected to each other through a jumper wiring JW5. The male electrode body 6T13 and the male electrode body 6T14 are connected to each other through jumper wirings JW8, JW9 via a fuse F2.

In this power supply device 1, constructed as discussed above, when the safety plug unit 60 is coupled with the safety plug unit connecting base 40, a series circuit having six battery modules B is constructed, and series voltage thereof can be output through the power supply output base 80. Also, when the safety plug unit 60 is removed from the safety plug unit connecting base 40, all of the connections between the respective battery modules B are cut off. Accordingly, the voltage of 48V, which in one embodiment generally equals the output voltage of a single battery module B, is applied to the female electrode bodies 4T of the safety plug unit connecting base 40 even at the maximum. Even if, therefore, a human being touches the female electrode bodies 4T, the risk of injury from an electric shock is reduced.

Additionally, when the safety plug unit 60 is coupled with the safety plug unit connecting base 40 and the series voltage power of the battery modules B is supplied to the vehicle loads, damage of equipment and wirings by large surge voltage, erroneous operations of the equipment made by generation of large noises, or the like can be inhibited when the safety plug unit 60 is removed. Thus, when the safety plug unit 60 is removed, the electric power supplied to the power supply output base 80 is interrupted.

Therefore, in this embodiment, the micro-switch 130 can detect the condition that the safety plug unit open/close cover 21 is in the open condition, to turn the relay 140 OFF. The power supply circuit is thereby disconnected from the vehicle loads. Thus, problems caused by the surge voltage or by the generation of noises are inhibited even though the safety plug unit 60 is removed. That is, because the coupling and decoupling actions of the safety plug unit 60 is accompanied with the movement of the safety plug unit open/close cover 21 between the open and closed position, the open condition of the safety plug unit open/close cover 21 is detected to surely disconnect the power supply circuit before the coupling or decoupling action is made. Accordingly, the risk of injury from contact to exposed electrodes is significantly reduced.

Additionally, the relay 140 can function as a switching means. However, other switching means are possible. The safety plug unit open/close cover 21 can function as a removal preventing means to mechanically prevent the safety plug unit from being removed from the safety plug unit connecting base, though other structure can be used to provide the removal preventing means. The micro-switch 130 can function as a switch operating means, though other switch operating means are possible. When the preventing means releases the safety plug unit, the switch operating means opens the switching means to open the power supply circuit.

Accordingly, in one embodiment, when a user removes the safety plug unit 60, the user can move the cover 21 to the close position. Thus, with the movement of the cover 21 to the close position, the switching means inevitably opens the power supply circuit.

Alternatively, for example, the power supply device can include a relay that selectively opens and closes the power supply circuit and open/close position condition detecting means for detecting an open/close condition of the cover 21. When the open/close position condition detecting means detects the open condition of the cover 21, the relay operates to open the power supply circuit.

Next, a structure of the power supply device 1 of this embodiment will be described.

As shown in FIGS. 3 and 4, the power supply device 1 can include the six battery modules B1, B2, B3, B4, B5, B6 inside of the battery containing box 20. The battery containing box 20 includes a lower battery box 22 forming a plate-like bottom section, a battery module assembly case 23 positioned above the lower battery box 22 and providing a frame for fixing the battery modules B in line, a battery module assembly cover 24 for covering a top surface of the battery module assembly case 23 when the battery modules B are fixed thereto, and an upper battery box 25 covering a top of the battery module assembly cover 24 and extending to a rear side of the vehicle (right side in FIGS. 3 and 4) to provide a surface for attaching wiring of the safety plug unit connecting base 40, the breaker 30, the power supply output base 80, the signal input base 110, etc.

The battery module assembly case 23 can have, in a left side surface thereof (e.g., surface located on the left side relative to the advancing direction of the vehicle), generally rectangular openings 23h through which power supply terminal forming surfaces of the respective battery modules B are exposed. Each battery module B can be fastened at three circumferential portions around the respective opening by bolts 23b. Also, in a right side surface (e.g., surface located on the right side relative to the advancing direction of the vehicle) of the battery module assembly case 23, a positioning member 23a is disposed to position the respective battery modules B at certain intervals. Accordingly, each battery module B can be fixed to the battery module assembly case 23 by the three bolts 23b in the left side surface and by the positioning member 23a in the right side surface.

Receptacles 27 are attached to the battery module assembly case 23 to connect power supply terminals of the respective battery modules B and wiring cables W (each mid portion thereof is omitted in FIG. 4) to each other. When the battery modules B are placed at preset positions of the battery module assembly case 23, electrodes of the respective battery modules B and electrodes of the respective receptacles 27 contact each other to provide an electrically connection.

When the battery modules B are placed within the battery module assembly case 23, the battery module assembly cover 24 can be mounted above the battery modules B to cover the top surfaces of the battery modules B.

The upper battery box 25 further covers the top surface of the battery module assembly cover 24 which is mounted to the battery module assembly case 23.

The upper battery box 25 can be a box with no bottom and include a battery side box 25b covering the battery module assembly case 23 and a wiring equipment side box 25a extending unitarily with and rearward from the battery side box 25b and having a lower top surface. The upper battery box 25 can be fixed to the lower battery box 22.

The wiring equipment side box 25a, which is a rear side portion of the upper battery box 25, can have top surfaces which have different heights to form at least two steps. The top surfaces define a plug attaching surface 25a1 to which the safety plug unit connecting base 40 and the breaker 30 can attach, and also define an input and output base attaching surface 25a2 which is positioned lower than the plug attaching surface 25a1 and to which the power supply output base 80 and the signal input base 110 can attach.

In addition, the upper battery box 25 has a hinge section 25d formed on a vertical wall surface 25c which defines a boundary between the battery side box 25b and the wiring equipment side box 25a. The safety plug unit open/close cover 21, which selectively covers and uncovers the safety plug unit 60, is journaled by the hinge section 25d.

A vertically extending cross section of the safety plug unit open/close cover 21 is shaped as the letter "L," and a tip end thereof has a manipulative piece 21a bent inside to form an L-shape in cross section to push an operative piece 133 of the micro-switch 130.

The safety plug unit open/close cover 21 has a lock mechanism 26 positioned outside of a surface of its rear portion (e.g., rear portion relative to the advancing direction of the vehicle) and between the cover 21 and a rear surface of the wiring equipment side box 25a so that, when the safety plug unit open/close cover 21 is closed, this close condition is maintained.

The plug attaching surface 25a1 of the wiring equipment side box has an opening for attaching the plug base and another opening for attaching the breaker both of which are not shown. The safety plug unit connecting base 40 and the breaker 30 are inserted into the respective openings to attach them to the plug attaching surface 25a1.

Next, the safety plug unit connecting base 40 will be described.

FIG. 5 is a schematic plan view showing a top surface of the safety plug unit connecting base 40. FIG. 6 is a schematic bottom plan view showing a bottom surface of the safety plug unit connecting base 40. FIG. 7 is a schematic cross sectional, vertical, side elevational view taken along the line A-A of FIG. 5. FIG. 8 is schematic a cross sectional, vertical, front elevational view taken along the line B-B of FIG. 5.

The safety plug unit connecting base 40 can have a body base section 41 including a generally elliptical body plate 41a fixed to the plug attaching surface 25a1 and a female electrode collective section 41b which extends upward from a top surface of the body plate 41a and acts as a joining section for joining the section 41 with the safety plug unit 60. The body plate 41a and the female electrode collective section 41 can be made of a nonconductive material and be unitarily formed.

In the illustrated embodiment, the body base section 41 has fourteen electrode containing apertures 41c each containing the respective female electrode body 4T and disposed at equal intervals in a plane (length and breadth directions). However, the body base section 41 van have any suitable number of electrode containing apertures 41c. The body base section 41 can also have circular grooves 41d defined around the respective electrode containing apertures 41c so that lower tubular guards 61d, which will be described later, of the safety plug unit 60 fit in the apertures 41c.

Additionally, in FIGS. 5 and 6, the reference numerals and symbols of the respective female electrode bodies 4T are followed by electrode numbers n (n=1~14) corresponding to those of FIG. 19 to indicate individual positions of the respective female electrode bodies 4T1-4T14.

The body base section 41 has reverse side surface openings 41e communicating with the respective electrode containing apertures 41c and each having an inner diameter larger than an inner diameter of the respective electrode containing aperture 41c and formed in a reverse side surface of the body base section 41. The female electrode bodies 4T are inserted into the electrode containing apertures 41c from and through the reverse side openings 41e. Each electrode containing aperture 41c has a stopper 41g which defines a small diameter step and is positioned slightly lower than a distal end opening 41f at the top. Each stopper 41g contacts with a distal end surface of the respective female electrode body 4T to function as a slip-off preventing section in the upward direction.

Each female electrode body 4T has a male electrode insertable section 4a into which the respective male electrode body 6T of the safety plug unit 60 is inserted. An inner circumferential surface of each male electrode insertable section 4a has a plurality of ring-shaped swells and recesses 4b. When the male electrode body 6T of the safety plug unit 60 is inserted into the section 4a, the swells and recesses 4b facilitate the attachment between the particular female electrode body 4T and the associated male electrode body 6T.

Each female electrode body 4T can have a different diameter step section 4c formed therearound and a threaded portion 4d formed at a reverse end side thereof. A ring body 42 is coupled to the female electrode body 4T from and through the reverse end thereof so that it contacts the different diameter step section 4c. Further, a cylindrical terminal guard 44 having a wiring cable terminal 43 is disposed on the female electrode body 4T. Afterwards, a nut 45 is screwed up onto the threaded portion 4d of the female electrode body 4T. Thereby, the wiring cable terminals 43 are coupled with the respective female electrode bodies 4T.

Each cylindrical terminal guard 44 can be a non-bottom cylindrical body made of a nonconductive material and having a cylindrical side surface 44a and a top surface 44b with an open bottom end. The top surface 44b has an opening 44c into which each female electrode body 4T is inserted. The cylindrical side surface 44a can have a cable holding ring 44d for holding a wiring cable W formed unitarily with the guard 44. A caulking portion of the wiring cable terminal 43 can be held inside of the cable holding ring 44d.

The distal end opening 41f of each electrode containing aperture 41c of the female electrode collective section 41b has a size which does not allow a finger of a human being to go through. The female electrode collective section 41b contains the female electrode bodies 4T at deep positions so that the distal ends of the respective female electrode bodies 4T are placed deeper than the distal end openings 41f of the respective electrode containing apertures 41c.

The safety plug unit connecting base 40 as thus formed has the fourteen female electrode bodies 4T arranged at equal intervals in the plane. In this embodiment, neighboring female electrode bodies 4T are arranged to be placed coaxially and at equal intervals.

Four fastening bolts 46 are inserted into the body plate 41a of the safety plug unit connecting base 40 to fasten the safety plug connecting base 40 to the plug attaching surface 25a1 of the wiring equipment side box 25a. The fastening bolts 46 are screwed up into bolt holes, which are not shown, formed in the plug attaching surface 25a1; thereby, the safety plug unit connecting base 40 is fastened to the plug attaching surface 25a1 of the wiring equipment side box 25a.

The body plate 41a of the safety plug unit connecting base 40 has through-holes 41h formed next to the respective fastening bolts 46. Each through-hole 41h has a larger diameter at the reverse surface side of the body plate 41a than the other side. An embedded nut 47 is embedded at this each large diameter portion. The through-holes 41h and the embedded nuts 47 are provided for fastening the safe plug unit 60 to the safe plug unit connecting base 40 by bolts (not shown) not to separate from each other when they are coupled with each other.

Portions to which the fourteen female electrode bodies 4T1-4T14 provided to the safe plug unit connecting base 40 are connected are those which are described with reference to FIGS. 2 and 19.

Next, the safety plug unit 60 will be described. FIG. 9 is a schematic top plan view showing a top surface of the safety plug unit. FIG. 10 is a schematic bottom plan view showing a bottom surface of the safety plug unit. FIG. 11 is a schematic vertical, cross sectional, side elevational view for explaining the major part under a condition that the male electrode bodies are attached. FIG. 12 is a schematic cross sectional, front elevational view taken along the line C-C of FIG. 9.

In the illustrated embodiment, the safety plug unit 60 includes a body plate 61 and the fourteen male electrode bodies 6T inserted into through-holes 61a defined by the body plate 61. The fourteen male electrode bodies 6T can be arranged at equal intervals so as to be inserted into the male electrode insertable sections 4a of the respective female electrode bodies 4T of the safe plug unit connecting base 40 when the safe plug unit 60 is coupled with the safe plug unit connecting base 40.

Additionally, in FIGS. 9 and 10, the reference numerals and symbols of the respective male electrode bodies 6T are followed by electrode numbers n (n=1~14) corresponding to those of FIG. 19 to indicate individual positions of the respective male electrode bodies 6T1-6T14.

The body plate 61 has five top joining tubular guards 61b surrounding some pairs of the male electrode bodies 6T and four top single tubular guards 61c surrounding individually one of the remainder male electrode bodies 6T, all of the guards 61b, 61c extending upward from a top surface of the body plate 61. The pairs of the male electrode bodies 6T surrounded by the top joining tubular guards 61b include a pair of the male electrode body 6T3 and the male electrode body 6T4, a pair of the male electrode body 6T5 and the male electrode body 6T6, a pair of the male electrode body 6T7 and the male electrode body 6T8, a pair of the male electrode body 6T9 and the male electrode body 6T10, and a pair of the male electrode body 6T11 and the male electrode body 6T12. The remainder male electrode body 6T1, male electrode body 6T2, male electrode body 6T13, and male electrode body 6T14 are surrounded by the top single tubular guards 61c.

An insertion section 61*ca* can be unitarily formed with each top single tubular guard 61*c* to allow a jumper wiring, which will be described later, to be inserted therethrough.

Also, the body plate 61 has bottom tubular guards 61*d* surrounding individually one of the fourteen male electrode bodies 6T and extending downward from a bottom surface of the body plate 61. In addition, the body plate 61 has a bottom circumferential guard 61*e* extending downward from the body plate 61 to surround the fourteen bottom tubular guards 61*d* and to tightly contact with an outer circumferential surface of the safe plug unit connecting base 40 when the safe plug unit 60 is coupled with the safe plug unit connecting base 40. The top joining tubular guards 61*b*, the top single tubular guards 61*c*, the bottom tubular guards 61*d* and the bottom circumferential guard 61*e* can be made of a nonconductive material and be unitarily formed with the body plate 61.

The body plate 61 has through-holes 61*f* defined at four positions opposing the through-holes 41*h* of the safety plug unit connecting base 40 when the safe plug unit 60 is coupled with the safe plug unit connecting base 40.

Each male electrode body 6T has a threaded portion 6*a* formed at a proximal end side (e.g., top surface side of the body plate) and a contact section 6*b* which can be fitted into the respective female electrode body 4T of the safe plug unit connecting base 40 formed at a distal end side (e.g., reverse surface side of the body plate 61). Also, each male electrode body 6T has a different diameter step section 6*c* formed at a mid portion thereof in its axial direction to contact with a reverse surface of the body plate 61 so as to be positioned and fixed to the body plate 61 with a certain length protruding from the body plate 61.

The body plate 61 has through-holes 61*h* defined at two positions on right and left sides and outside of the electrode body collective area in which the fourteen male electrode bodies 6T can be equally arranged. Fuse mounting bolts FB1, FB2, FB3, FB4 are inserted into the through holes 61*h*. Hereunder, the four fuse mounting bolts are simply generically called "fuse mounting bolt FB".

The fuse mounting bolts FB1, FB2 are used for fixing the fuse F1, while the fuse mounting bolts FB3, FB4 are used for fixing the fuse F2. The respective fuses F1, F2 are fixed to the body plate 61 with connecting terminals FT thereof being inserted into the respective fuse mounting bolts FB from the bottom surface side of the body plate 61. The fuses F1, F2 are fastened up by nuts 63, 64 from the top surface side of the body plate 61 and from the bottom surface side of the connecting terminal FT.

On the top surface of the body plate 61, the pairs of the male electrode bodies 6T surrounded by the respective top joining tubular guards 61*b* are connected to the counterparts through jumper wirings JW1, JW2, JW3, JW4, JW5. That is, the male electrode body 6T3 and the male electrode body 6T4 are connected to each other through the jumper wiring JW1. The male electrode body 6T5 and the male electrode body 6T6 are connected to each other through the jumper wiring JW2. The male electrode body 6T7 and the male electrode body 6T8 are connected to each other through the jumper wiring JW3. The male electrode body 6T9 and the male electrode body 6T10 are connected to each other through the jumper wiring JW4. The male electrode body 6T11 and the male electrode body 6T12 are connected to each other through the jumper wiring JW5.

The four male electrode bodies 6T1, 6T2, 6T13, 6T14 and four fuse mounting bolts FB1, FB2, FB3, FB4 are connected to each other, respectively, through jumper wirings JW6, JW7, JW8, JW9. That is, the male electrode body 6T1 and the fuse mounting bolt FB1 are connected to each other through the jumper wiring JW6. The male electrode body 6T2 and the fuse mounting bolt FB2 are connected to each other through the jumper wiring JW7. The male electrode body 6T13 and the fuse mounting bolt FB3 are connected to each other through the jumper wiring JW8. The male electrode body 6T14 and the fuse mounting bolt FB4 are connected to each other through the jumper wiring JW9.

The jumper wirings JW1-JW5 are electrically connected to the male electrode bodies 6T3, 6T4, 6T5, 6T6, 6T7, 6T8, 6T9, 6T10, 6T11, 6T12 with connecting terminals JT of ends of the respective jumper wirings being putted onto the respective male electrode bodies and fastened up by nuts 67.

The jumper wirings JW6-JW9 are electrically connected to the male electrode bodies 6T1, 6T2, 6T13, 6T14 with one connecting terminals JT thereof being putted onto the respective male electrode bodies and fastened up by the nuts 67, and also are electrically connected to the fuse mounting bolts FB1, FB2, FB3, FB4 with the other connecting terminals JT thereof being putted onto the respective fuse mounting bolts and fastened up by the nuts 63. On this occasion, the male electrode bodies 6T and the fuse mounting bolts FB are also firmly attached to the body plate 61.

Accordingly, the male electrode body 6T3 and the male electrode body 6T4, the male electrode body 6T5 and the male electrode body 6T6, the male electrode body 6T7 and the male electrode body 6T8, the male electrode body 6T9 and the male electrode body 6T10, and the male electrode body 6T11 and the male electrode body 6T12 are electrically connected to each other. Also, the male electrode body 6T1 and the male electrode body 6T2, and the male electrode body 6T13 and the male electrode body 6T14 are electrically connected to each other through the fuse F1 and the fuse F2, respectively.

Additionally, the male electrode bodies 6T and the jumper wirings JW1-JW9 correspond to the coupling electrodes, in accordance with one embodiment.

The body plate 61 can have flange sections 61*i*, 61*j* extending rightward and leftward (e.g., right and left directions relative the advancing direction of the vehicle) from the coupling area of the male electrode bodies 6T. The flange section 61*i* extending on the right side (e.g., upper side of FIG. 9) of the body plate 61 can cover a top end of a power supply coupler device 100 and can have a slit 61K in the center thereof to allow a power supply output coupler 90 to extend therethrough. Similarly, the flange section 61*j* extending on the left side (e.g., lower side of FIG. 9) can cover a top end of the breaker 30.

In the illustrated embodiment, when the safety plug unit 60, as thus constructed, is placed opposite the safe plug unit connecting base 40 and is coupled thereto, as shown in FIG. 13, the bottom tubular guards 61 d of the safety plug unit 60 are inserted into the circular grooves 41*d* of the safety plug unit base 40, and the male electrode bodies 6T of the safety plug unit 60 are inserted into the male electrode insertable sections 4*a* of the female electrode bodies 4T of the safety plug unit base 40. Thereby, the fourteen female electrode bodies 4T1, 4T2, 4T3, 4T4, 4T5, 4T6, 4T7, 4T8, 4T9, 4T10, 4T11, 4T12, 4T13, 4T14 of the safety plug unit connecting base 40 and the fourteen male electrode bodies 6T1, 6T2, 6T3, 6T4, 6T5, 6T6, 6T7, 6T8, 6T9, 6T10, 6T11, 6T12, 6T13, 6T14 of the safety plug unit 60 are electrically connected to each other, respectively (the counterparts having the same electrode number).

Accordingly, the minus power supply terminal BT− of the sixth battery module B6 and the plus power supply terminal BT+ of the fifth battery module B5 are connected to each other through the jumper wiring JW1 provided to the safety plug unit connecting base 40. The minus power supply terminal BT− of the fifth battery module B5 and the plus power supply terminal BT+ of the fourth battery module B4 are connected to each other through the jumper wiring JW2. The minus power supply terminal BT− of the fourth battery module B4 and the plus power supply terminal BT+ of the third battery module B3 are connected to each other through the jumper wiring JW3. The minus power supply terminal BT− of the third battery module B3 and the plus power supply terminal BT+ of the second battery module B2 are connected to each other through the jumper wiring JW4. The minus power supply terminal BT− of the second battery module B2 and the plus power supply terminal BT+ of the first battery module B1 are connected to each other through the jumper wiring JW5. Also, the plus power supply terminal BT+ of the sixth battery module B6 is connected to the plus female electrode body 8T+ via the fuse F1 through the jumper wirings JW6, JW7. The minus power supply terminal BT− of the first battery module B1 is connected to the minus female electrode body 8T− via the breaker 30, the fuse F2 and the relay 140 through the jumper wirings JW8, JW9.

As the result, the circuit including six battery modules B connected in series can be formed.

When the safety plug unit 60 is coupled with the safety plug unit connecting base 40 as discussed above, the bottom circumferential guard 61e of the safety plug unit 60 covers the circumference of the safety plug unit connecting base 40 in a tightly coupling state.

When the safety plug unit 60 is coupled with the safety plug unit connecting base 40, the bolts, which are not shown, are inserted into the through-holes 61f from the location above the safety plug unit 60 and are screwed into the embedded nuts 47 positioned on the bottom surface of the safety plug unit connecting base 40. Thereby, the safety plug unit 60 and the safety plug unit connecting base 40 are securely joined with each other.

Next, the power supply coupler device 100 will be described. FIG. 14 is a schematic plan view showing a top surface of the power supply output base 80. FIG. 15 is a schematic bottom plan view showing a bottom surface of the power supply output base 80. FIG. 16 is a schematic cross sectional, front elevational view taken along the line D-D of FIG. 14. FIG. 17 is a schematic vertical, cross sectional, front elevational view of the power supply output coupler 90.

The power supply output base 80 can have a body base section 81 including a disk-shaped body plate 81a fixed to an input/output base attaching surface 25a2 and a coupler joint section 81b protruding upward from a top surface of the body plate 81a to be a joint portion with the power supply output coupler 90. The body plate 81a and the coupler joint section 81b can be made of a nonconductive material and unitarily formed.

The coupler joint section 81b has two electrode containing apertures 81c formed for containing a plus female electrode body 8T+ and a minus female electrode body 8T− (generically called "female electrode body 8T" if they do not need to differ from each other) disposed side by side. A circular groove 81d into which an electrode protecting tube 91c, which will be described later, of the power supply output coupler 90 is fitted can be formed around each electrode containing aperture 81c.

The body base section 81 can have reverse side openings 81e communicating with the respective electrode containing apertures 81c, each having an inner diameter larger than an inner diameter of the respective electrode containing aperture 81c formed in a reverse side surface of the body base section 81. The female electrode bodies 8T can be inserted into the electrode containing apertures 81c from and through those two reverse side surface openings 81e. Each electrode containing aperture 81c can have a stopper 81g that defines a small diameter step and is positioned slightly lower than a distal end opening 81f at the top. Each stopper 81g contacts a distal end surface of the respective female electrode body 8T to function as a slip-off preventing section in the upward direction.

Each female electrode body 8T has a male electrode insertable section 8a at its distal end into which the respective male electrode body 9T of the power supply output coupler 90 can be inserted. An inner circumferential surface of each male electrode insertable section 8a can have a plurality of ring-shaped swells and recesses 8b. When the male electrode body 9T of the power supply output coupler 90 is inserted into the section 8a, the swells and recesses 8b facilitate the coupling between the particular female electrode body 8T and the associated male electrode body 9T.

Each female electrode body 8T can have a different diameter step section 8c formed therearound and a threaded portion 8d formed at a reverse end side thereof. A ring body 82 can be put onto the female electrode body 8T from and through the reverse end thereof to contact the different diameter step section 8c. Further, a cylindrical terminal guard 84 having a wiring cable terminal 83 can be put onto the female electrode body 8T. A nut 85 can be screwed onto the threaded portion 8d of the female electrode body 8T. Thereby, the wiring cable terminals 83 can be coupled with the respective female electrode bodies 8T.

Each cylindrical terminal guard 84 is a non-bottom cylindrical body made of a nonconductive material and having a cylindrical side surface 84a and a top surface 84b with its bottom being opened. The top surface 84b has an opening 84c into which each female electrode body 8T is inserted. The cylindrical side surface 84a has a cable holding ring 84d for holding a wiring cable W formed unitarily with the guard 84. A caulking portion of the wiring cable terminal 83 is held inside of the cable holding ring 84d.

The plus female electrode body 8T+ is connected to the female electrode body 4T1 of the safety plug unit connecting base 40 through one of the wiring cables W, while the minus female electrode body 8T− is connected to the relay 140 through another one of the wiring cables W.

The distal end opening 81f of each electrode containing aperture 81c of the coupler joint section 81b can be sized to not allow a finger of a human being to go through. The coupler joint section 81b can house the female electrode bodies 8T at deep positions so that the distal ends of the respective female electrode bodies 8T are placed deeper than the distal end openings 81f of the respective electrode containing apertures 81c.

Four fastening bolts 86 can be inserted into the body plate 81a of the power supply output base 80 to fasten the power supply output base 80 to the input/output base attaching surface 25a2 of the wiring equipment side box 25a. The fastening bolts 86 are screwed up into bolt holes, which are not shown, formed in the input/output base attaching surface 25a2 to thereby fasten the power supply output base 80 to the wiring equipment side box 25a.

The body plate 81a of the power supply output base 80 can have through-holes 81h formed between the respective fastening bolts 86. Each through-hole 81h can have a larger diameter at the reverse surface side of the body plate 81a than the other side for receiving an embedded nut 87 therein. The through-holes 81h and the embedded nuts 87 are provided for fastening the power supply output coupler 90 to the power supply output base 80 with bolts while inhibiting the decoupling of the power supply output coupler 90 with the power supply output base 80.

The power supply output coupler 90 can supply the electric power to the vehicle electrical loads (e.g., electric motor) through wiring cables (not shown) by being fitted into the coupler joint section 81*b* of the power supply output base 80. As shown in the cross sectional view of FIG. 17, the coupler 90 includes a coupler body 91, which can be made of a nonconductive material, and the plus male electrode body 9T+ and the minus male electrode body 9T− (generically called "male electrode body 9T" if they do not need to differ from each other) can both be inserted into the coupler body 91 to be fixed thereto.

The coupler body 91 can include a disk-shaped body plate 91*a* defining two inserting apertures 91*e* into which the plus male electrode body 9T+ and the minus male electrode 9T− are inserted side by side, two top tubular guards 91*b* each protruding from a top surface of the body plate 91*a* to surround the respective male electrode bodies 9T, two bottom tubular guards 91*c* each protruding from a bottom surface of the body plate 91*a* to surround the respective male electrode bodies 9T, and a bottom circumferential guard 91*d* protruding downward from a circumference of the bottom surface of the body plate 91*a*. The bottom circumferential guard 91*d* is a portion that tightly contacts with an outer circumferential surface of the power supply output base 80 when the power supply output coupler 90 is coupled with the power supply output base 80.

The plus male electrode body 9T+ and the minus male electrode body 9T− are disposed side by side so that they can be inserted into the male electrode insertable sections 8*a* of the plus female electrode body 8T+ and the minus female electrode body 8T−, respectively, when the power supply output coupler 90 is coupled with the coupler joint section 81*b* of the power supply output base 80.

Each male electrode body 9T has a threaded portion 9*a* formed at a proximal end side (e.g., top surface side of the body plate) and a contact section 9*b* which can be fitted into the respective female electrode body 8T of the power supply output base 80 formed at a distal end side (e.g., reverse surface side of the body plate 91). Also, each male electrode body 9T has a different diameter step section 9*c* formed at a mid portion thereof in its axial direction to contact with a bottom surface of the body plate 91*a* so as to be positioned and fixed to the body plate 91*a* with a certain length protruding from the body plate 91*a*.

The male electrode bodies 9T are inserted into the body plate 91*a* from the bottom surface side thereof, and wiring cable terminals, which are not shown, to the vehicle electrical loads are disposed onto the male electrode bodies 9T from the top surface side thereof. Nuts 92 are screwed up from the proximal end side. Thereby, the power supply output coupler 90 is assembled.

Additionally, the body plate 91*a* has through-holes (not shown) at positions opposing the through-holes 81*h* of the power supply output base 80 when the power supply output coupler 90 is coupled with the power supply output base 80.

In the illustrated embodiment, when the power supply coupler 90 as thus constructed, is placed opposite the power supply output base 80 and is coupled thereto, as shown in FIG. 18, the bottom tubular guards 91*c* of the power supply output coupler 90 are inserted into the circular grooves 81*d* of the power supply output base 80, and the male electrode bodies 9T of the power supply output coupler 90 are inserted into the male electrode insertable sections 8*a* of the female electrode bodies 8T of the power supply output base 80. In this construction, the bottom circumferential guard 91*d* of the power supply output coupler 90 covers the circumference of the power supply output base 80 in a tightly coupling state.

When the power supply output coupler 90 is coupled with the power supply output base 80, the bolts, which are not shown, are inserted into the through-holes from the location above the power supply output coupler 90 and are screwed into the embedded nuts 87 positioned on the bottom surface of the power supply output coupler 90. Thereby, the power supply output coupler 90 and the power supply output base 80 are securely joined with each other.

The signal input base 110 can be disposed in front of the power supply output base 80 in the input/output base attaching surface 25*a*2 of the wiring equipment side box 25*a*. This signal input base 10 functions as a signal input terminal base, with the signal input coupler 115 being coupled therewith, through which the ON signal of the ignition switch (not shown) is input.

Also, the wiring equipment side box 25*a* can house the micro-switch 130 inside thereof. The operative piece 133 of the micro-switch 130 can be exposed from the input/output base attaching surface 25*a*2. When the safety plug open/close cover 21 is closed, the operative piece 133 is pushed downward to connect the contact points.

According to the power supply device 1 of the embodiment described above, the removal of the safety plug unit 60 from the safety plug unit connecting base 40 disconnects the battery modules B from each other to allow maintenance and inspection, or assembly work. In this embodiment, the safety plug unit 60 cuts off all of the connections between the battery modules B connected in series. Thus, the voltage applied to the male electrode bodies 4T of the safety plug unit connecting base 40 is equal to a maximum of the output voltage of the single battery module B (i.e., the applied voltage can be reduced to a minimum amount). This ensures an individual performing such maintenance or inspection work will not be exposed to high voltage levels.

Particularly, in this embodiment, the output voltage of the respective battery modules B can be limited to less than 50V. Accordingly, even if a human being inadvertently comes in contact with the female electrode bodies 4T of the safety plug unit connecting base 40, the individual will be exposed to a relatively low voltage.

Each battery module B can be formed with the package containing multiple cells connected to each other in series. Also, the battery containing box 20 surrounds the battery modules B. Therefore, each battery module B can have improved anti-shock qualities, heat resistance, weather resistance and safety features.

The diameter of the distal end opening 41*f* of each electrode containing aperture 41*c*, which contains the respective female electrode body 4T of the safety plug unit connecting base 40, and the diameter of the distal end opening 81*f* of each electrode containing aperture 81*c*, which contains the respective female electrode body 8T of the power supply output base 80, can be sized small enough to inhibit a finger of a human being from passing therethrough. Such sizing of these diameters can thus provide improved safety qualities for the power supply device 1.

The multiple female electrode bodies 4T can be collectively positioned on the safety plug unit connecting base 40 and arranged at the equal intervals in the plane. Thus, the arrangement area can be smaller, and the safety plug device 50 (e.g., the safety plug unit connecting base 40 and the safety plug unit 60) can be downsized and readily handled. In contrast, in conventional power supply devices, if the output voltage of each battery is lowered to improve safety, the number of batteries needs to be increased to have high voltage and thus the number of divisions of the series circuit of the batteries needs to be increased. Accordingly, the number of plug connective electrodes inevitably increases.

Because each battery module B contains multiple cells connected to each other in series as a package so that the output voltage thereof is greater than 12V, the battery module B can supply a voltage higher than that of a normal vehicle battery and beyond a voltage which a single battery module can supply. Therefore, a high voltage that is suitable for a hybrid drive can be obtained with less number of battery modules, while providing improved safety features to inhibit exposure to the high voltage levels of the battery module B and allowing reduction in size of the power supply device.

As a result, the power supply device itself can be downsized and can be disposed above the rear wheel of the motorcycle.

When the safety plug unit 60 is removed, the safety plug unit open/close cover 21 is inevitably opened. Together with this action, the micro-switch 130 is moved to the OFF condition to open the battery power supply circuit. This feature inhibits exposure to large current flows if, for example, the safety plug unit 60 is removed while a large current flows to the vehicle electrical loads from the power supply output coupler 90. Consequently, damages of equipment and wirings made by large voltage surge, erroneous operations of the equipment made by generation of large noises, or the like can be prevented. Accordingly, the safety qualities of the power supply device 1 are further improved.

The breaker 30 is positioned between the series power supply circuit of the battery modules B and the power supply output base 80. Therefore, even if any excessive current consumption or an accident of short circuit occurs between the power supply device 1 and the vehicle electrical loads, the breaker disconnects the circuit, thus providing an additional safety feature.

The safety plug unit 60 has the fuses F connected to the battery series circuit in series therein. Thus, not only the circuit is disconnected against the excessive current consumption between the power supply device 1 and the vehicle electrical loads or any short circuit accidents, but also the current flow is intercepted against any short circuit accidents on the power supply side in the power supply device 1 with which the breaker is not able to cope, any malfunctions of the breaker 30 or the like. The safety qualities of the power supply device 1 can thus be improved further. In addition, because the safety plug unit 60 has the fuses F therein, risk of electric shock in the exchange service of the fuses is minimized.

The safety plug unit connecting base 40 has the female electrode body 4T1 and the female electrode body 4T14 electrically connected to the plus female electrode body 8T+ and the minus female electrode body 8T− of the power supply output base 80, respectively. When the safety plug 60 is removed from the safety plug unit connecting base 40, both ends of the series circuit of the battery modules B and the output electrodes (the plus female electrode body 8T+ and the minus female electrode body 8T−) are disconnected from each other. Hence, no battery voltage is applied to the power supply output base 80, thereby improving the safety qualities further.

In this embodiment, the power supply output coupler 90 is disposed below the flange section 61i of the safety plug 60. Thus, when the power supply output coupler 90 is removed from the power supply output base 80, the safety plug unit 60 is inevitably removed previously. The power supply circuit for supplying the power to the power supply output base 80 is disconnected from the power supply output base 80 and the safety qualities are improved further.

The embodiment of the power supply device 1 for an electric vehicle is described above. The present invention, however, is not limited to the disclosed embodiments. Various modifications or alternatives are applicable as long as they do not deviate from the objects of the present invention.

For example, in the embodiment, the power supply device applied to the hybrid type motorcycle is described. However, the present invention can be applied to four-wheeled automobiles or the like other than the motorcycles. In addition, the present invention is applicable to electric automobiles that have no engine.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A power supply device for a vehicle, the power supply device comprising:
    a plurality of batteries;
    a battery container arranged to house the plurality of batteries;
    a safety plug unit connecting base including a plurality of plus electrodes and a plurality of minus electrodes, each plus electrode electrically connected to a plus terminal of a respective battery through wiring and each minus electrode electrically connected to a minus terminal of a respective battery through wiring, the plus electrodes and the minus electrodes being disposed outside of the battery container;
    a safety plug unit arranged to be coupled to the safety plug unit connecting base, the safety plug unit including coupling electrodes arranged to electrically connect the plus electrodes and the minus electrodes and thereby connect the plurality of batteries in series to define a power supply circuit when the safety plug unit is coupled to the safety plug unit connecting base;
    a removal preventing mechanism arranged to be selectively and mechanically moved to a closed position to prevent decoupling of the safety plug unit from the safety plug unit connecting base and moved to a completely open position, while the safety plug unit is coupled to the safety plug unit connecting base, to thereafter allow the decoupling of the safety plug unit from the safety plug unit connecting base;
    a switch arranged to selectively open and close the power supply circuit while the safety plug unit is still coupled to the safety plug unit connecting base; and
    a switch operating mechanism arranged to maintain the switch in an open condition when the removal preventing mechanism is moved to the open position, while the safety plug unit is coupled to the safety plug unit connecting base, to thereafter allow the decoupling of the safety plug unit from the safety plug unit connecting base.

2. The power supply device of claim 1, wherein the safety plug unit connecting base is arranged such that the plus electrodes and the minus electrodes are collectively positioned in a limited area and are arranged substantially at equal intervals in a plane.

3. The power supply device of claim 1, wherein each one of the batteries includes a plurality of cells connected to each other in series, and an output voltage from each battery is greater than 12V and less than 50V.

4. The power supply device of claim 1, wherein the removal preventing mechanism includes a cover arranged to selectively move between the open position and the closed position, and the switch operating mechanism operates in response to the open and closed position of the cover to keep the switching mechanism in an open condition when the cover is in the open position.

5. The power supply device of claim 1, further comprising a breaker disposed in the power supply circuit and arranged to protect the power supply circuit from an excessive current.

6. The power supply device of claim 1, wherein a fuse is provided in the safety plug unit and arranged to connect to the plurality of batteries in series.

7. The power supply device of claim 6, wherein the fuse is positioned on a reverse side of the safety plug unit and arranged so that replacement of the fuse is inhibited while the safety plug unit is coupled to the plug unit connecting base.

8. The power supply device of claim 1, wherein the power supply device is disposed above a rear wheel of a hybrid motorcycle and supplies power to the hybrid motorcycle, the hybrid motorcycle being arranged to operate via power generated by a combination of an internal combustion engine and an electric motor.

9. The power supply device of claim 1, wherein the safety plug unit connecting base is arranged to be securely coupled to the safety plug unit connecting base even when the removal preventing mechanism is moved to the completely open position.

10. A power supply device for a vehicle, the power supply device comprising:
   a plurality of batteries;
   a container arranged to house the plurality of batteries;
   a safety plug unit base having a plurality of plus and minus electrodes electrically connected to the plurality of batteries, each plus electrode electrically connected to a plus terminal of a respective battery, each minus electrode electrically connected to a minus terminal of a respective battery, the plus and minus electrodes disposed outside of the container;
   a safety plug unit including coupling electrodes arranged to be coupled to the safety plug unit base to electrically connect the plus electrodes and the minus electrodes to thereby connect the plurality of batteries in series to define a power supply circuit to output a voltage, the safety plug unit arranged to disconnect the batteries from each other upon decoupling of the safety plug unit from the safety plug unit base;
   a cover arranged to selectively and mechanically be moved to a position to prevent access to the safety plug unit to prevent decoupling the safety plug unit from the safety plug unit connecting base, and be moved to a completely open position, while the safety plug unit is coupled to the safety plug unit connecting base, to thereafter allow the decoupling of the safety plug unit from the safety plug unit connecting base;
   a switch disposed in a power supply line and arranged to selectively open and close the power supply circuit while the safety plug unit is still coupled to the safety plug unit connecting base; and
   a switch operating mechanism arranged to maintain the switch in an open condition when the safety plug unit is coupled to the safety plug unit connecting base and the cover is arranged to allow the decoupling of the safety plug unit from the safety plug unit connecting base.

11. The power supply device of claim 10, wherein each one of the batteries includes a plurality of cells connected to each other in series, and an output voltage from each battery is greater than 12V and less than 50V.

12. The power supply device of claim 10, wherein the voltage provided by the plurality of batteries while the safety plug unit is decoupled from the safety plug unit base is substantially equal to the voltage provided by one of the batteries.

13. The power supply device of claim 10, wherein the safety plug unit connecting base is arranged to be securely coupled to the safety plug unit connecting base even when the cover is moved to the completely open position.

* * * * *